US 8,166,484 B2

(12) United States Patent
Kawato

(10) Patent No.: US 8,166,484 B2
(45) Date of Patent: Apr. 24, 2012

(54) SYSTEM FOR CONFIRMING AND CANCELLING TENTATIVE RESOURCE RESERVATION WITHIN THE VALID TIME INDICATES PERIOD DURING WHICH THE TENTATIVE RESERVATION REQUEST IS VALID

(75) Inventor: Masahiro Kawato, Tokyo (JP)

(73) Assignee: NEC Corporation, Tokyo (JP)

( * ) Notice: Subject to any disclaimer, the term of this patent is extended or adjusted under 35 U.S.C. 154(b) by 2255 days.

(21) Appl. No.: 10/804,110

(22) Filed: Mar. 19, 2004

(65) Prior Publication Data
US 2004/0215780 A1 Oct. 28, 2004

(30) Foreign Application Priority Data
Mar. 31, 2003 (JP) .................. 2003-093459

(51) Int. Cl.
G06F 9/46 (2006.01)
(52) U.S. Cl. ...................................... 718/104
(58) Field of Classification Search ............... 718/104
See application file for complete search history.

(56) References Cited

U.S. PATENT DOCUMENTS
5,826,082 A * 10/1998 Bishop et al. ............. 718/104
2002/0083185 A1 * 6/2002 Ruttenberg et al. ......... 709/232

FOREIGN PATENT DOCUMENTS
| JP | 10-78938 | 3/1998 |
| JP | 10-78938 A | 3/1998 |
| JP | 2000-259537 A | 9/2000 |
| JP | 2002-185491 A | 6/2002 |
| JP | 2003-500961 A | 1/2003 |

OTHER PUBLICATIONS

Smith, W., et al., "Scheduling with Advanced Reservations," Parallel and Distributed Processing Symposium, 2000. IPDPS 2000, IEEE, May 5, 2000, pp. 127-132.
Smith, W., et al, Scheduling with Advanced Reservations, Parallel and Distributed Processing Symposium, 2000. IPDPS 2000., May 5, 2000, pp. 127-132.

* cited by examiner

Primary Examiner — Meng An
Assistant Examiner — Mengyao Zhe
(74) Attorney, Agent, or Firm — Sughrue Mion, PLLC

(57) ABSTRACT

For a resource reservation in a distributed resource system, a tentative reservation request and a job reservation request are issued from a job scheduler to a resource management unit. The tentative reservation is valid for a short time period, and cannot coexist with another tentative reservation or the job reservation. In order to actually use resources, a job reservation must be issued after registration of the tentative reservation. If a tentative reservation request is received for a resource to which another tentative reservation request is already accepted, the tentative reservation request is stored in a wait queue, which is successful if the another tentative reservation is cancelled or failed due to the expiration of the validity time period.

36 Claims, 23 Drawing Sheets

FIG. 4
(A)
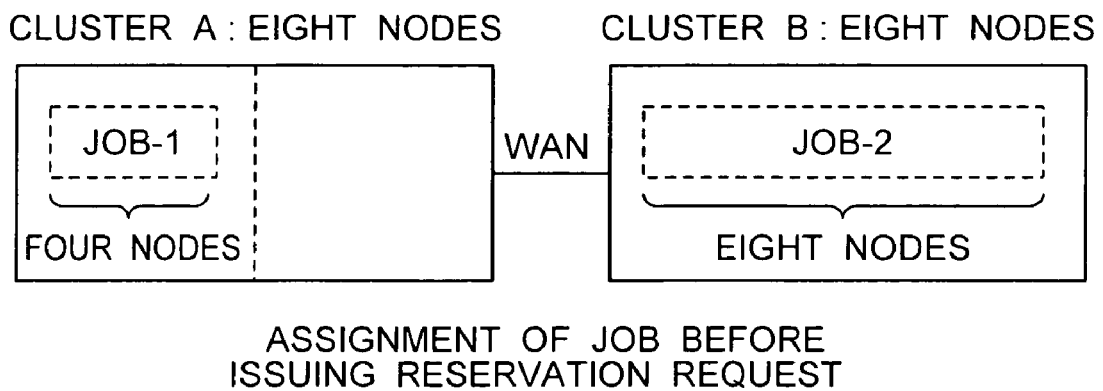
ASSIGNMENT OF JOB BEFORE
ISSUING RESERVATION REQUEST
(B)
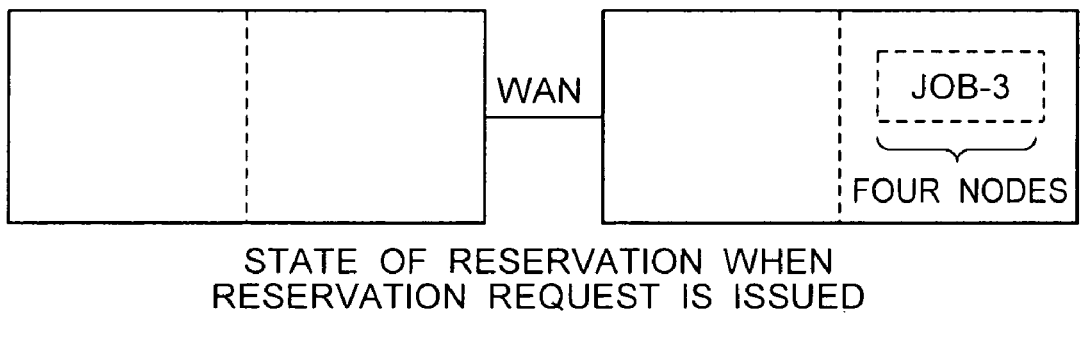
STATE OF RESERVATION WHEN
RESERVATION REQUEST IS ISSUED
(C)
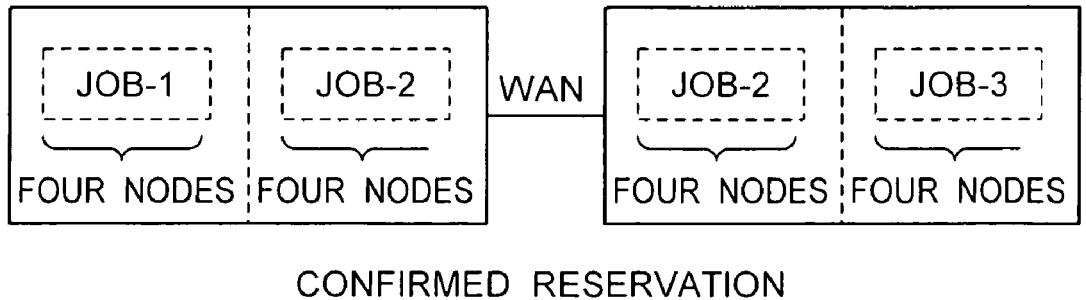
CONFIRMED RESERVATION

FIG. 9
(A)
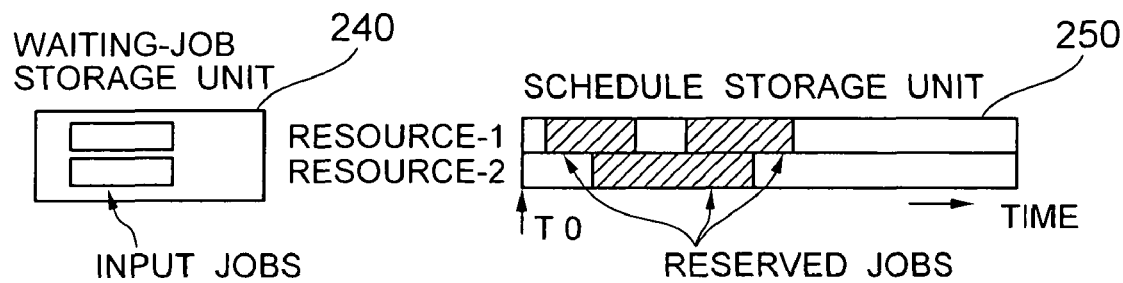
(B)
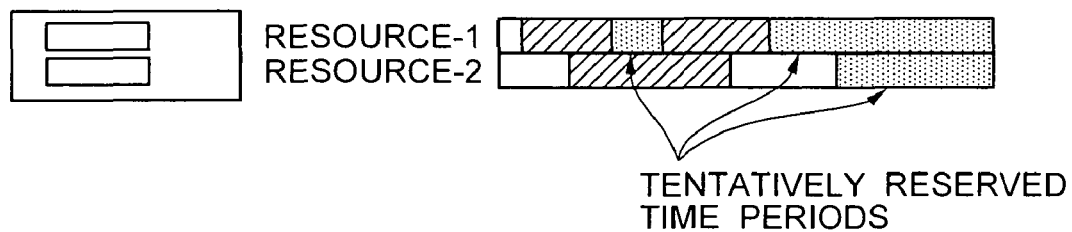
(C)
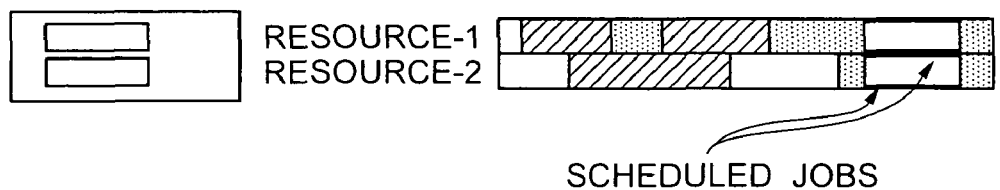
(D)
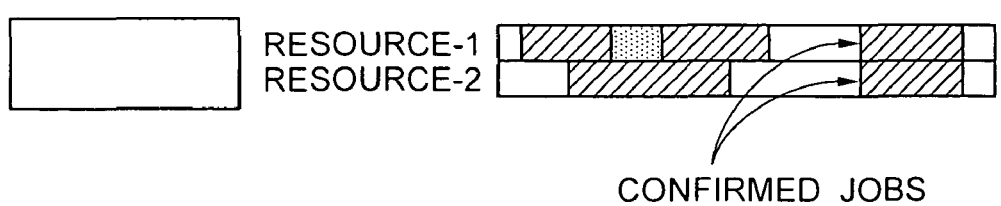

FIG.11
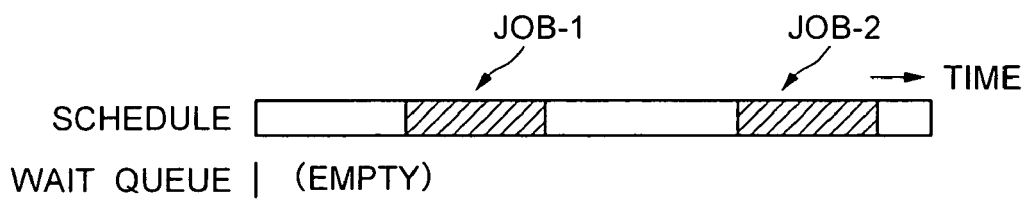
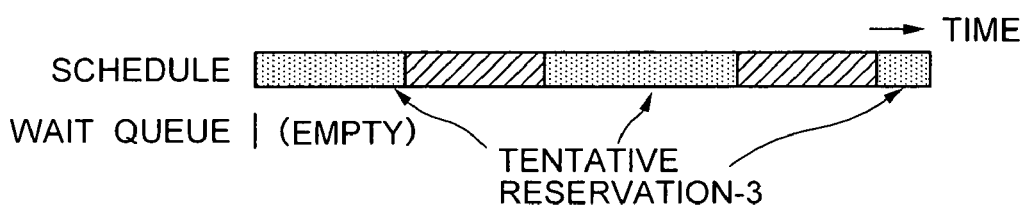
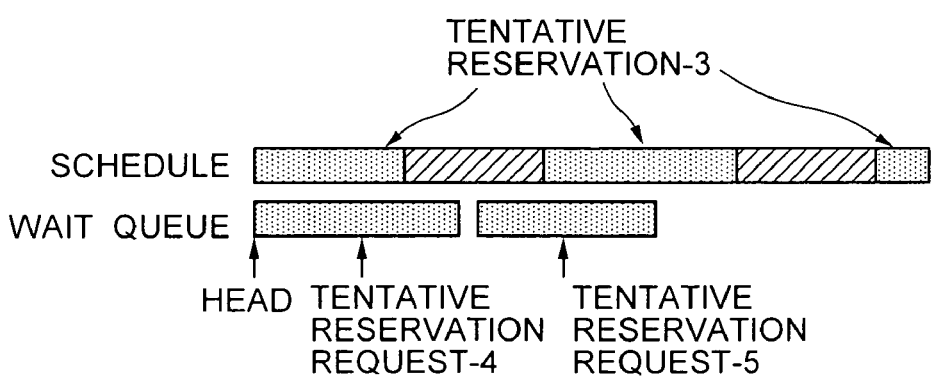
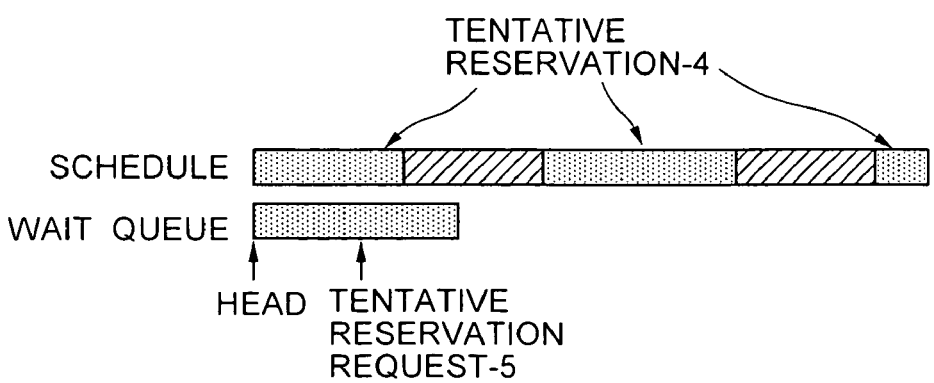

FIG.19

SCHEDULDE
STORAGE UNIT IN RESOURCE
MANAGEMENT UNIT-1

| NODE-11 | JOB-2 OBJECT:FILE B#0 |
| NODE-12 | JOB-2 OBJECT:FILE B#1 |
| NODE-13 | |
| NODE-14 | |

SCHEDULDE
STORAGE UNIT IN RESOURCE
MANAGEMENT UNIT-2

| NODE-21 | JOB-1 OBJECT:FILE A#0 |
| NODE-22 | JOB-1 OBJECT:FILE A#1 |
| NODE-23 | JOB-1 OBJECT:FILE A#2 |
| NODE-24 | JOB-1 OBJECT:FILE A#3 |

↑ T0 → TIME

FIG.20

SCHEDULDE STORAGE UNIT IN RESOURCE MANAGEMENT UNIT-1

| NODE-11 | JOB-2 OBJECT:FILE B#0 |
| NODE-12 | JOB-2 OBJECT:FILE B#1 |
| NODE-13 | JOB-1 OBJECT:FILE A#2 |
| NODE-14 | JOB-1 OBJECT:FILE A#3 |

SCHEDULDE STORAGE UNIT IN RESOURCE MANAGEMENT UNIT-2

| NODE-21 | JOB-1 OBJECT:FILE A#0 |
| NODE-22 | JOB-1 OBJECT:FILE A#1 |
| NODE-23 | |
| NODE-24 | |

↑ T0 → TIME

SYSTEM FOR CONFIRMING AND CANCELLING TENTATIVE RESOURCE RESERVATION WITHIN THE VALID TIME INDICATES PERIOD DURING WHICH THE TENTATIVE RESERVATION REQUEST IS VALID

BACKGROUND OF THE INVENTION

1. Field of the Invention

The present invention relates to a distributed resource management system and, more particularly, to a distributed resource management system that performs resource reservation on a per job basis.

The present invention also relates to a method for managing resource reservation and a computer program for defining the procedure of the method.

2. Description of the Related Art

A distributed computing system (distributed resource system) includes a variety of resources such as computers, storage units, and networks. Hence, in order to obtain quality of service (QoS) necessary for a specific job, a resource management scheme that guarantees quality of service on the resource management over a plurality of resources is needed. In particular, in a grid computing scheme where a plurality of sub-systems (hereinafter, each called "domain") managed independently of each other share resources, it is often the case that integral management of the resources of the entire system is not possible. In this kind of system, a QoS guarantee function is needed which uses a plurality of independent resource management units.

An advance reservation of resources is known in a conventional technology that guarantees QoS in a distributed resource system (hereinafter, reservation refers to the advance reservation unless cited otherwise). The term "advance reservation" refers to an operation that guarantees the QoS of individual resources necessary for the execution of a job during a given time period.

With reference to FIGS. 1A and 1B, an example of the advance reservation of resources will be described. Here, a process is considered wherein the data input from a storage unit B is analyzed by a computer A and the result is stored in a storage unit C (refer to FIG. 1A).

In order to perform a series of processes without any delay, the resources to be used, that is, the computer A, the storage unit B, and the storage unit C are reserved in advance. At that time, a reservation for a data input process in the computer A and a reservation for a data read-out process in the storage B should be made for the same time period (see FIG. 1B). It is also the case with a data output process in the computer A and a data write-in process in the storage C.

An example of a conventional resource management system having an advance reservation function is known (refer to, for example, Japanese Patent Laid-Open Publication No. 2000-259537 (p. 5, FIG. 1)). As shown in FIG. 2, this conventional resource management system includes a plurality of user terminals 400, a plurality of resources 300, a plurality of connection control apparatuses 700, and a resource management unit 800. A conventional resource reservation system having such a configuration operates as follows:

(1) A user terminal 400 issues a reservation request via one of the plurality of connection control apparatuses 700 to the resource management unit 800.

(2) As a result of the reservation request of the above step (1), a reservation certificate is passed to the user terminal 400.

(3) When it reaches the time for which the reservation has been made, the user terminal 400 issues a resource-use request including the reservation certificate issued in the step (2) to a resource 300 reserved.

In the system described in Patent Publication 2000-259537, the single resource management unit 800 integrally manages advance reservations of the resources. Therefore, the system described in the above patent publication cannot be applied to a distributed resource system wherein a plurality of resource management units manage the resources.

Another resource management technology is known which is based on the premise that the resources are managed in a distributed manner (refer to, for example, a first non-patent literature: Ian Foster et. al., "A Distributed Resource Management Architecture that Supports Advance Reservations and Co-Allocation", International Workshop on Quality of Service 99., 1999).

As shown in FIG. 3, the resource reservation system described in the above literature includes a plurality of user terminals 400, a plurality of resources 300, a plurality of job schedulers 500 (each referred to as "co-reservation agent" in the literature), and a resource information service 600. Each resource 300 has a resource management section incorporated therein. A conventional resource reservation system having such a configuration operates as follows:

(1) A user terminal 400 issues a reservation request to one of the plurality of job schedulers 500.

(2) The job scheduler 500 enquires the resource information service 600 to find out the state of reservations of the resources.

(3) The job scheduler 500 determines a resource to be reserved based on the reservation state found in the above step (2) and issues a resource reservation request to the resource management section of the resource to be reserved. When there are a plurality of resources to be reserved, a resource reservation request is issued to the resource management section of each of the resources 300 likewise.

(4) As a result of the resource reservation request in the above step (3), a reservation ID for the reservation is issued and passed to the user terminal 400 of the above step (1).

(5) The user terminal 400 of the above step (1) issues a resource-use request including a corresponding reservation ID obtained in the above step (4) to the resource management section of each resource 300 reserved in the above step (3).

There are known architectures where a plurality of client terminals reserve shared resources. In such an architecture, the client terminals send reservation entries each including start time, time period, and repetition time sequence as resource requests to an AV/C bulletin board. The resource requests are organized as a resource calendar for notifying incurred reservation conflicts to the resources and the users. The system includes a resource schedule controller that allocates the above resources to the client terminals (refer to, for example, Japanese Patent Laid-Open Publication No. 2003-500961 (pp. 14-17, FIG. 1)).

Furthermore, there are known systems wherein tentative reservations of resources are made. In such a system, a first terminal issues a request message for a resource reservation. When receiving the request message, each node apparatus determines whether the reservation is possible; if possible, makes a tentative reservation and issues the request message to a next apparatus; or if not possible, issues a response message that the reservation was denied to a previous apparatus. When receiving the request message, a second terminal determines whether or not it is possible to respond to data communication and issues a response message whether or not the reservation is possible to a previous apparatus. When receiving a response message that the reservation is possible, each node apparatus changes the tentative reservation to a real reservation and issues a response message that the reservation is possible to a previous apparatus (for example, Japanese Patent Laid-Open Publication No. 2002-185491 (pp. 3-5, FIG. 1)).

It is to be noted that a job scheduling which will be described later follows a known algorithm (refer to, for example, second non-patent literature: "Heuristic Algorithms for Scheduling Independent Tasks on Nonidentical Processors", The Journal of the ACM, Volume 24 Issue 2, 1977). The description thereof is incorporated herein by reference.

In a distributed resource system having a plurality of resource management units, there is the problem that the usability of the resources decreases when multiple jobs are executed at once. The reason for that will be detailed below.

There are the following two kinds of methods for executing a plurality of jobs by using advance reservations of resources:

(i) The first method, after making advance reservations of resources possibly to be used by the jobs, is to select resources, to which the jobs are to be assigned, and time periods from among the resources successfully reserved.

(ii) The second method, after determining resources, to which the jobs are to be assigned and time periods, is to make advance reservations of the determined individual resources for the time periods.

In the above method (i), resources are reserved for the time interval during which the jobs are not actually executed, and thus the usability of the resources decreases compared with the above method (ii). Moreover, there is the problem that, when a failure occurs in the user terminal that is to issue use-requests to the resources reserved, no one can use the resources reserved for a long time interval.

On the other hand, in the above method (ii), resources that are going to be reserved may have been already reserved by another user. In this case, a reservation failure occurs, and thus an appropriate combinational operation of resources may not be able to be used.

It is when the job scheduler (500 in FIG. 3) determining the assignment of jobs does not hold the latest resource-reservation state that a reservation failure occurs. The resource-reservation state information can be obtained by enquiring of the resource information service (600 in FIG. 3); however, the information from the resource information service does not necessarily reflect the latest information. If it is possible to directly enquire the reservation states of individual resources, it will take a long time to enquire the states of multiple resources, during which the states may change. Furthermore, the reservation states may be changed during job scheduling for determining the assignment of jobs to the resources and reservation execution.

The failure of a reservation becomes a problem for a job that uses a plurality of resources simultaneously and the case where there are dependencies between a plurality of jobs. For those jobs, when reservations of some of the resources fail, rescheduling must be performed to reserve the remaining resources. In this case, the combinational operation of resources successfully reserved earlier and resources successfully reserved later may be less appropriate than a combination which would be possible at an earlier stage.

The decrease in the usability of resources due to the failure of a reservation will be described hereinafter with reference to FIG. 4. In this example, two computer clusters A, B are connected via a wide area network (WAN). Each cluster consists of eight nodes. It is considered in this system that a job scheduler makes reservations of resources, for a parallel job-1 using four nodes and a parallel job-2 using eight nodes.

The reservation state that the job scheduler grasps is that no reservation exists in each cluster. In this situation, as a possible job assignment by the job scheduler, it may be that job-1 is assigned to four nodes of cluster A and job-2 is assigned to eight nodes of cluster B (FIG. 4(A)). Meanwhile, it is assumed that another job-3 has been already assigned to four nodes of cluster B (FIG. 4(B)). In this case, for job-1, all reservations are successful and for job-2, only reservations of four nodes of cluster A are successful. It is assumed here that the job scheduler reschedules part of job-2 for which it failed to reserve and that, as a result, four nodes of cluster A is selected (FIG. 4(C)). As a result, job-2 is assigned over clusters A and B. If the reservation state shown in FIG. 4(B) is known in advance, job-2 can be assigned to only cluster A, and then there is no need for communication through WAN. That is, the usability of the network resources decreases due to the failure of proper reservations Although the above example is the case where the usability of network resources decreases, there may be a case where the usability of another kind of resources decreases. For example, a specific parallel job, to which computers having an equal performance are preferably allocated, may have computers unequal in performance allocated thereto.

Furthermore, not only for a parallel job but also for a plurality of jobs having interdependencies, the usability of resources may decrease. For example, in the case where the output of a job is an input of another job, these jobs are preferably assigned to the same resource or resources connected via the same local area network (LAN). However, when a reservation fails for one job, a resource which can be allocated to the job having failed in the reservation may be disposed on a LAN different from the LAN where a successfully reserved resource exists.

More specifically, since the reservation state of resources cannot be exactly grasped for a job simultaneously using a plurality of resources or jobs having interdependencies, an inefficient combinational operation of resources other than an inherently possible combinational operation of resources may be allocated.

SUMMARY OF THE INVENTION

In view of the above, an object of the present invention is to provide a distributed resource management system, method, and program that enables scheduling of jobs based on the exact reservation state of resources and realizes an appropriate combinational operation of resources for each job in a distributed resource system where a plurality of resource management units manage the resources.

The present invention provides, in a first aspect thereof, a resource management unit for managing one or a plurality of resources, including: a first section that, upon accepting a tentative reservation request designating at least one resource, changes a free time period of the designated resource to a tentatively reserved time period based on the tentative reservation request, the first section storing therein information of a valid time period and a issuer of the tentative reservation request; a storage unit for storing at least one the tentative reservation request in a wait queue disposed corresponding to each designated resource for which another tentative reservation request designating the tentatively reserved time period already exists; and a second section that issues information of the tentatively reserved time period and a corresponding tentative reservation ID in response to the tentative reservation request.

The present invention provides, in a second aspect thereof, a job scheduler communicated with at least one resource management unit for scheduling a job, the job controller including: a first member that issues a tentative reservation request designating each resource of a plurality of resources to be used in a job, to a resource management unit managing the each resource; a second member that receives a notification of a tentatively reserved state of the each resource or storage of the tentative reservation request in a wait queue in response to the tentative reservation request; a third member that assigns the job to at least one first resource, for which the tentatively reserved state is received and selected from among the plurality of resources, while excluding at least one second resource among the plurality of resources, to create a job schedule including an execution time period of each of the first resource; a fourth member that issues a job reservation request for the first resource, to the resource management unit managing the first resource; and a fifth member that issues a tentative reservation cancel request for the second resource, to the resource management unit managing the second resource.

The present invention provides, in a third aspect thereof, a distributed resource management system including: at least one resource management unit that manages one or a plurality of resources; and at least one job scheduler communicated with the at least one resource management unit, the job scheduler having a job reservation function including issuing a tentative reservation request for a plurality of resources to be used in a job, the resource management unit including: a first section that receives two kinds of reservation requests for tentative reservation and job reservation, issued by the job scheduler, wherein the tentative reservation is a combinational operation of acquiring a reservation state of resources and trying to tentatively reserve resources, and is performed designating at least one resource managed by the resource management unit; a second section that, if a resource for which the tentative reservation request received from the job scheduler does not have another tentative reservation and has a free time period thereof, sets a tentatively reserved state for the resource and issues information of the tentatively reserved state including a tentatively reserved time period in response to the tentative reservation request; a third section that stores a validity time period and information of the job scheduler having issued the tentative reservation request in connection with the tentatively reserved time period, wherein the job reservation includes an operation of reserving resources in advance for execution of a designated job and is performed via a job reservation request designating at least one resource that is managed by the resource management unit and a reservation time period of the resource; a fourth section that accepts the job reservation request and changes the reservation time period specified by the job reservation request to a job reserved state, if the specified time period is included in a tentatively-reserved time period and the issuer of the job reservation request matches with the issuer of the tentative reservation request; and a fifth section that, when it reaches a start time specified by the job reservation, controls to allocate the resource for execution of the job and/or, when it reaches an end time specified by the job reservation, controls to release allocation of the resource to the job.

The present invention provides, in a fourth aspect thereof, a method for use in a resource management unit that manages one or a plurality of resources, including the steps of: upon accepting a tentative reservation request designating at least one resource, changing a free time period of the designated resource to a tentatively reserved time period based on the tentative reservation request, and storing a valid time period and a issuer of the tentative reservation request; storing at least one the tentative reservation request in a wait queue disposed corresponding to each designated resource for which another tentative reservation request designating the tentatively reserved time period already exists; and issuing a tentative reservation ID corresponding to the tentatively reserved time period in response to the tentative reservation request.

The present invention provides, in a fifth aspect thereof, a method for use in a job scheduler, communicated with one or a plurality of resource management units, for scheduling a job, the method including the steps of: issuing at least one tentative reservation request designating a plurality of the resources to at least one resource management unit managing the plurality of the resources; receiving information including a tentatively reserved state for each of the plurality of resources; assigning the job to at least one first resource, for which the tentatively reserved state is received and selected from among the plurality of resources, while excluding at least one second resource among the plurality of resources, to create a job schedule including an execution time period of each of the first resource; issuing a job reservation request for the first resource, to the resource management unit managing the first resource; and issuing a tentative reservation cancel request for the second resource, to the resource management unit managing the second resource.

The present invention provides, in a sixth aspect thereof, a method for use in a distributed resource management system including at least one resource management unit for managing at least one resource and at least one job scheduler communicated with the resource management unit, the method including the steps of: receiving two kinds of reservation requests for tentative reservation and job reservation in the resource management unit, issued by the job scheduler, wherein the tentative reservation is a combinational operation of acquiring a reservation state of resources and trying to tentatively reserve resources, and is performed designating at least one resource managed by the resource management unit; setting in the resource management unit a tentatively reserved state for the resource and issuing the tentatively reserved state including a tentatively reserved time period in response to the tentative reservation request, if a resource for which the tentative reservation request received from the job scheduler does not have another tentative reservation and has a free time period thereof; storing in the resource management unit a validity time period and information of the job scheduler having issued the tentative reservation request in connection with the tentatively reserved time period, wherein the job reservation includes an operation of reserving resources in advance for execution of a designated job and is performed via a job reservation request designating at least one resource that is managed by the resource management unit and a reservation time period of the resource; accepting by the resource management unit the job reservation request and changing the time period designated by the job reservation request to a job-reserved state, if the designated time period is included in a tentatively-reserved time period and the issuer of the job reservation request matches with the issuer of the tentative reservation request; and controlling to allocate the resource for execution of the job, when it reaches a start time designated by the job reservation, and/or to release allocation of the resource to the job, when it reaches an end time designated by the job reservation.

The present invention provides, in a seventh aspect thereof, a distributed resource management system including: a resource management unit for managing at least one resource; a job scheduler communicated with the resource management unit to schedule a job to use the resources; and a user terminal communicated with the job scheduler for consecutively issuing a tentative reservation request and a job reservation request for each the resource to the resource management unit, the resource management unit including: a first section that receives the tentative reservation request from the job scheduler to set a resource designated by the tentative reservation request in a tentatively reserved state; and a second section that, when a tentative reservation request is issued for an already, tentatively reserved resource, stores the tentative reservation request in a wait queue, wherein the user terminal requests the job scheduler to execute a job, and wherein the job scheduler comprises a first member that, after issuing a tentative reservation request to the resource management unit, determines resources to which the job is assigned and issues a job reservation request to the resource management unit to reserve the resources necessary for execution of the job.

The present invention provides, in an eighth aspect thereof, a distributed resource management method for a distributed resource system including at least one resource management unit that manages one or a plurality of resources; at least one job scheduler communicated with the at least one resource management unit and schedules a job to use the resources; and at least one user terminal communicated with the job scheduler, the method including the steps of: consecutively issuing a tentative reservation request and a job reservation request from the job scheduler for each the resource to the resource management unit; after a tentative reservation request is issued for an already, tentatively reserved resource from the job scheduler, storing the tentative reservation request in a wait queue of the resource management unit; and after issuing a tentative reservation request to the resource management unit for each the resource, the job scheduler determining resources to which the job is assigned and issuing a job reservation request to the resource management unit to reserve the resources necessary for execution of the job.

The present invention provides, in a ninth aspect thereof, a program for running on a computer constituting a resource management unit, which manages one or a plurality of resources, the program defining the steps of: upon accepting a tentative reservation request designating at least one resource, changing at least one free time period of the resource to a tentatively reserved time period, and storing information of a validity time period and the issuer of the tentative reservation request in a storage unit; storing the tentative reservation request in a wait queue for one of the at least one resource that already has a tentatively-reserved time period; and issuing information of the tentatively reserved time period and tentative reservation ID in response to the tentative reservation request.

The present invention provides, in a tenth aspect thereof, a program for running on a computer constituting a job scheduler, that is communicated with a resource management unit, which manages one or a plurality of resources, the program defining the steps of: issuing a tentative reservation request for each of resources to be used by a job to the resource management unit managing the resource; selecting resources to which the job is assigned from among resources that are tentatively reserved by the resource management unit and determining a time period for execution; issuing a job reservation request for each of the resources determined by the selecting step to the resource management unit managing the selected resource; and issuing a tentative reservation cancel request for at least one of the resources tentatively reserved by the tentative reservation request issuing step to the resource management unit managing the resource.

According to the present invention, in order to make a reservation for use of resources, the resource management unit acts in two stages: the tentative reservation and the job reservation. The tentative reservation is valid for a short time period, and cannot coexist with another tentative reservation and the job reservation. When actually using resources, a job reservation is executed after a tentative reservation. If it is tried to actually reserve a resource that is tentatively reserved, the request of actual reservation is stored in a wait queue so as to ensure that the tentative reservation becomes successful later. A user terminal requests the job scheduler to execute a job, and after performing a tentative reservation on the resource management unit, the job scheduler determines resources to which the job is to be assigned and executes a job reservation to reserve resources necessary for the execution of the job.

In accordance with the distributed resource management unit of the present invention, an undesirable situation does not occur where only some of reservations fail for a job using a plurality of resources simultaneously or jobs having interdependencies. Thus, the usability of resources can be improved in a distributed resource system where resources are managed in a distributed manner.

The above and other objects, features and advantages of the present invention will be more apparent from the following description, referring to the accompanying drawings.

BRIEF DESCRIPTION OF THE DRAWINGS

FIG. 4 shows exemplified states of allocation of resources in the another conventional distributed resource management system;

FIG. 9 includes a plurality of schematic diagrams (A) to (D) each showing the state of the schedule storage unit 250 in the job scheduler shown in FIG. 5;

FIG. 11 includes a plurality of schematic diagrams each showing the state of the wait queue handled by the tentative-reservation-request receiving section 110 of the resource management unit shown in FIG. 5;

FIG. 19 is a schematic diagram showing the results of job scheduling in the resource management units in the first embodiment of the present invention;

FIG. 20 is a schematic diagram showing the results of job scheduling in the resource management units in a comparative example;

DETAILED DESCRIPTION OF THE PREFERRED EMBODIMENTS

Before describing preferred embodiments of the present invention, the principle of the present invention will be described for a better understanding of the present invention.

Figure 1A:
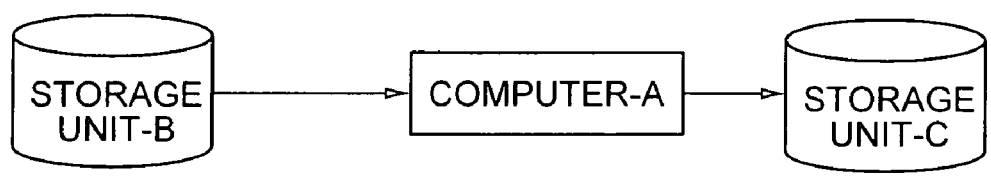
FIG. 1A is a block diagram of a typical distributed resource system.
Figure 1B:
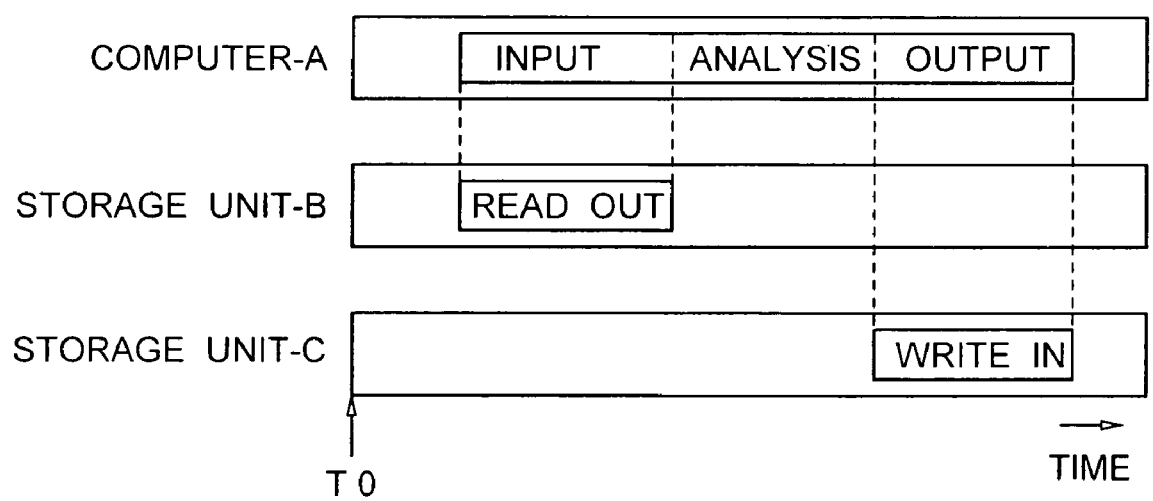
FIG. 1B is a schematic block diagram showing the procedure of the advance reservation of resources used in an example of a distributed resource management system for the distributed resource system of FIG. 1A.
Figure 2:
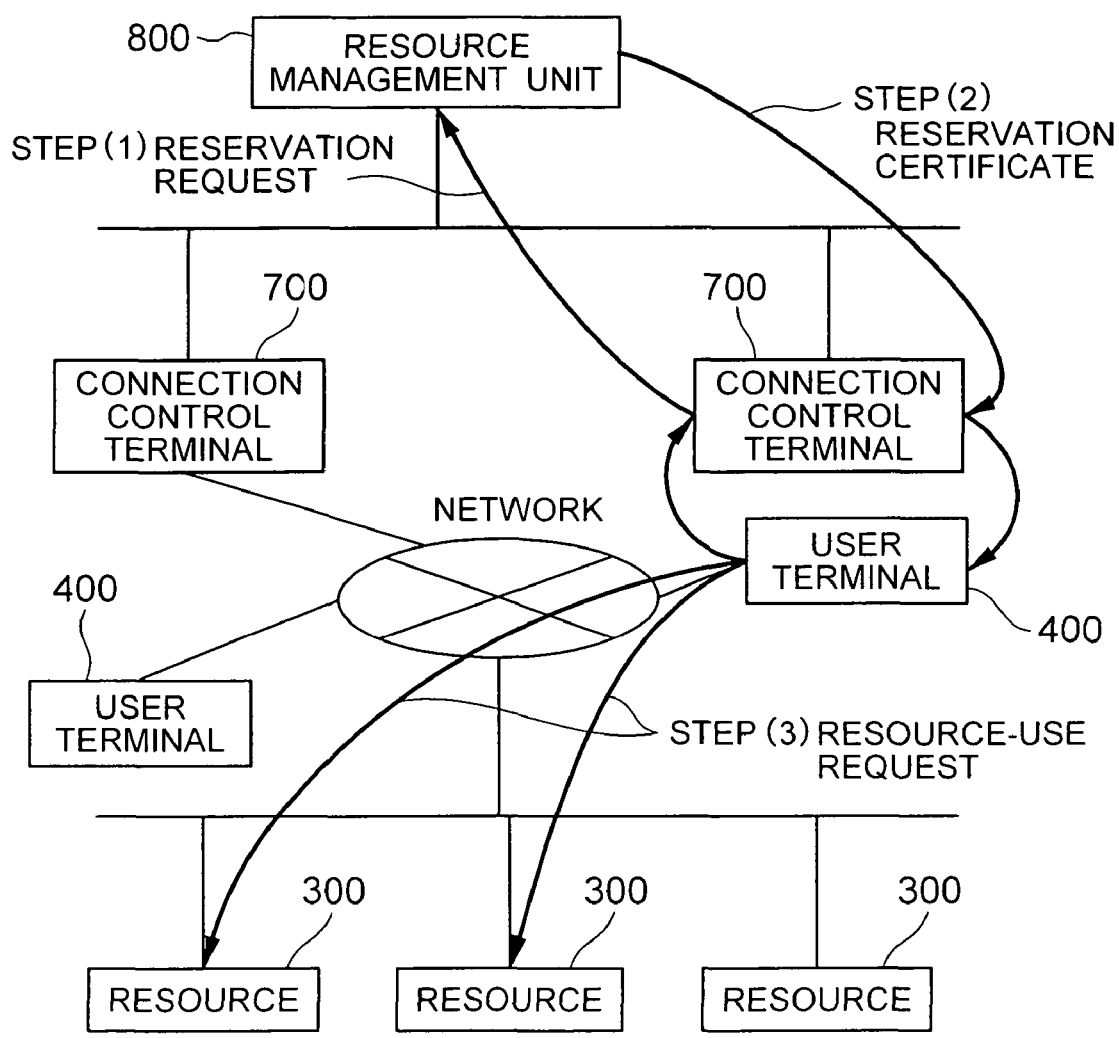
FIG. 2 is a schematic block diagram showing the configuration and procedures of a conventional distributed resource management system.
Figure 3:
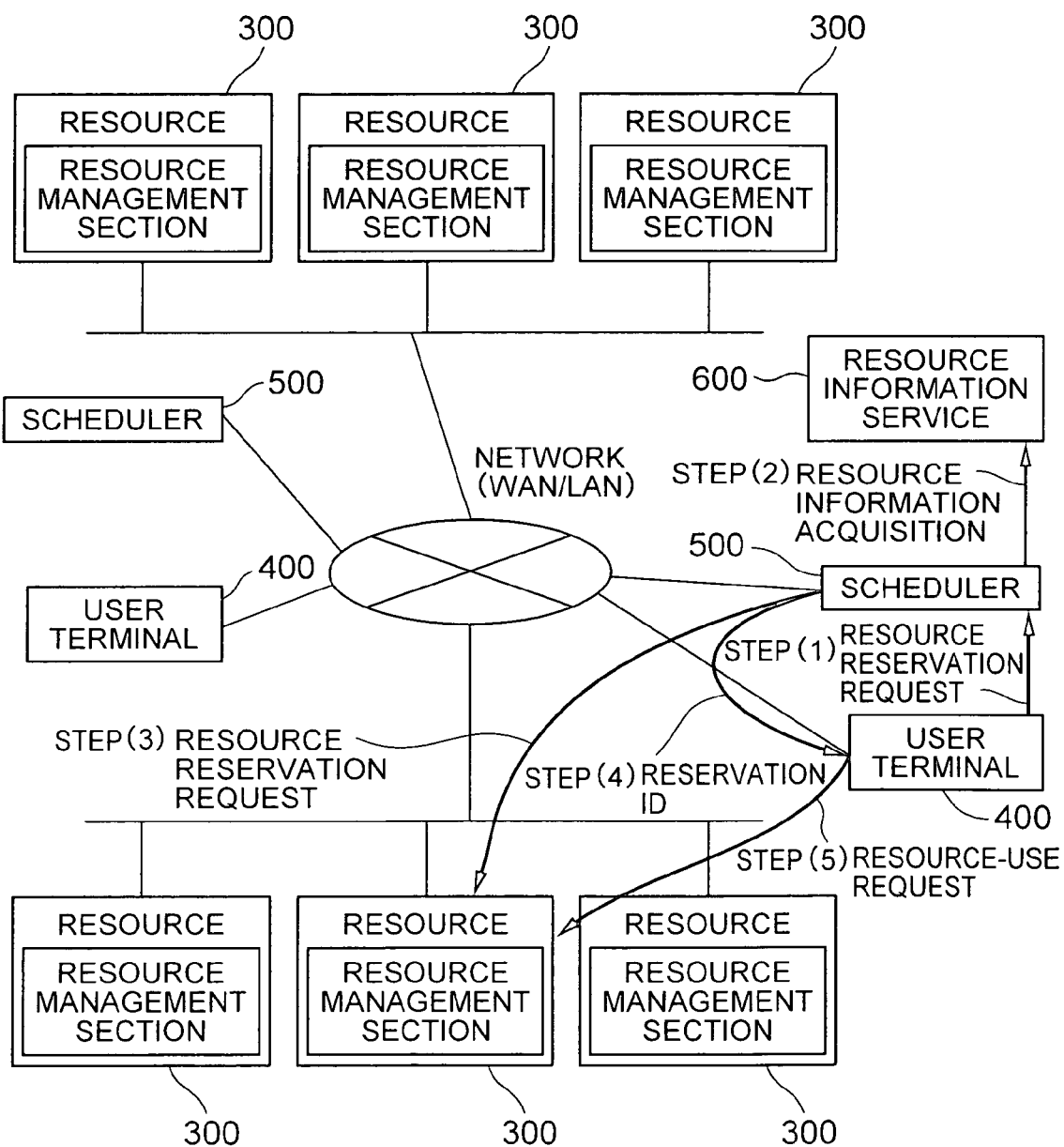
FIG. 3 is a schematic block diagram showing the configuration and procedures of another conventional distributed resource management system.
Figure 5:
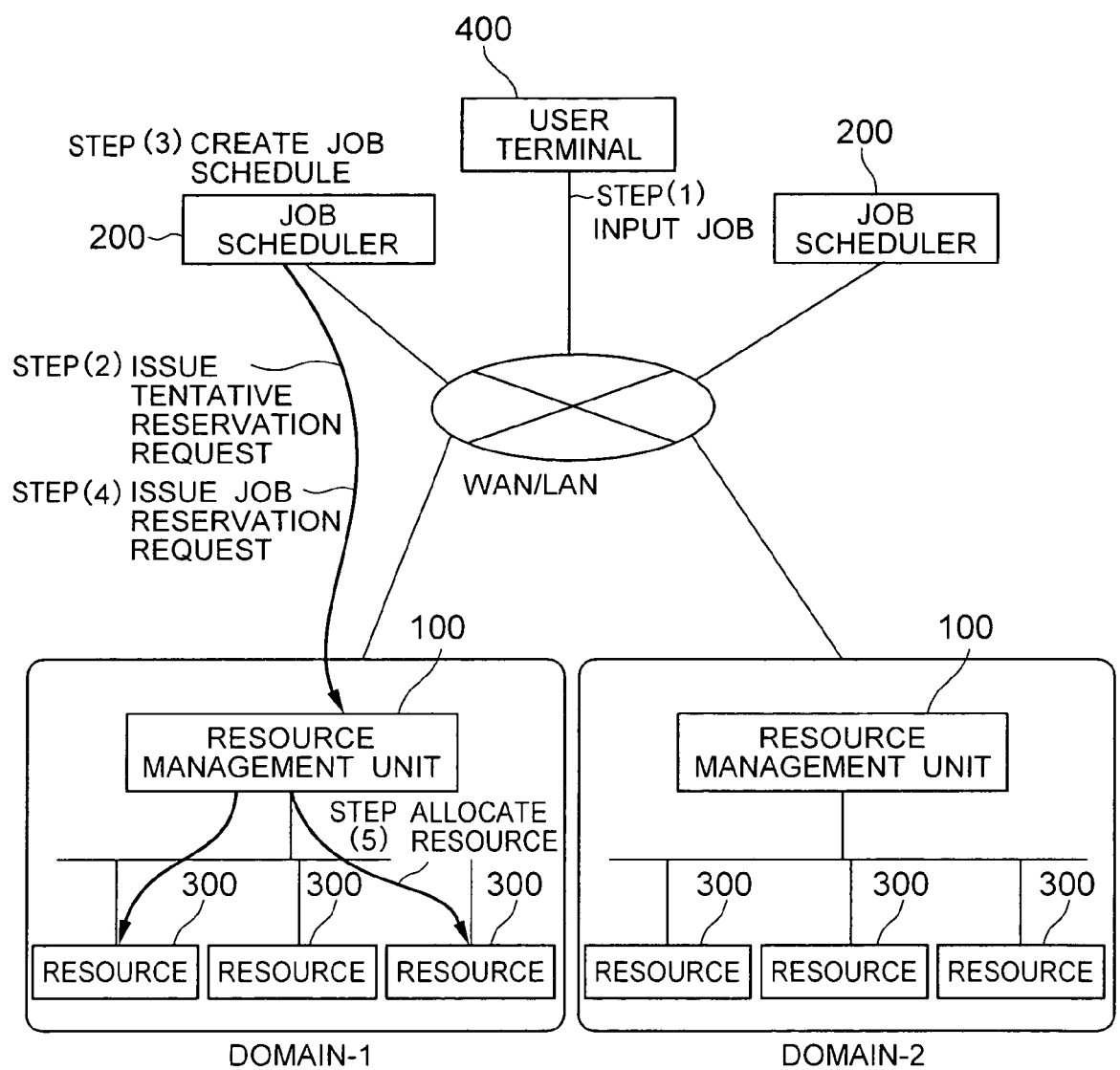
FIG. 5 is a schematic block diagram exemplifying the configuration and procedures of a distributed resource management system according to the principle of the present invention.

Referring to FIG. 5, a distributed resource management system according to an example of the present invention includes a plurality of resource management units 100 and a single or a plurality of job schedulers 200. A plurality of resources 300 are managed by a corresponding one of the resource management units 100.

The resource management unit 100 receives two kinds of reservation requests, including a tentative reservation request and a job reservation request issued by a job scheduler 200, and also receives two kinds of cancellation requests, including a tentative reservation cancel request and a job cancel request, which correspond to the respective reservation requests.

The tentative reservation in the present invention is a combinational operation including acquisition of the current reservation state of resources and lock (or reservation) of the resources, and one of the resources under the management by the resource management unit 100 is designated to execute the tentative reservation thereof. When a resource for which a tentative reservation request is made has no other tentative reservation made and has a free time available, the time period designated by the tentative reservation becomes reserved tentatively and the time period tentatively reserved is notified in response to the tentative reservation request. The free time is a time period during which neither of the tentative reservation and the job reservation exists. For the tentatively reserved time period, expiration time instant and information of the job scheduler that issued the tentative reservation request are stored. The tentative reservation having reached the expiration time thereof is automatically discarded.

The job reservation is an operation that reserves a resource in advance for the execution of a specific job, and is executed via a job reservation request designating one of the resources managed by the resource management unit and a time period of the one of the resources. If the designated time period is part of a time period tentatively reserved and the issuer of the job reservation request matches with the issuer of the tentative reservation request, the job reservation request is accepted and the designated time period is set in a job-reserved state. When it reached the start time designated by the job reservation, the resource management unit allocates the resource for the execution of the job and, when it reached the end time designated by the job reservation, releases the allocation of the resource to the job.

In the present invention, a job is executed in the following order. First, a user inputs the job to the job scheduler 200 via a user terminal 400 in step (1) shown in FIG. 5.

The job scheduler 200 performs a process of assigning the input job to resources periodically. The assigning of resources by the job scheduler 200 includes issuing a tentative reservation request to the resource management unit in step (2), creating the job execution schedule for the resources, the tentative reservations of which have been successful, in step (3), and issuing a job reservation request according to the execution schedule in step (4). The resource management unit 100, based on the job reservation request received, allocates resources disposed under the management thereof for the execution of the job in step (5).

If another job scheduler 200 issues a tentative reservation request for the same resource during the time interval when the tentative reservation by the job scheduler 200 is valid, the another job scheduler 200 fails to achieve the tentative reservation. In this control technique, if the successful job scheduler 200 does not actually assign the job to the resource, the failed job scheduler 200 cannot assign the job to the resource, which causes waist of resource. In order to solve this problem in the present invention, upon receiving a tentative reservation request for a resource already tentatively reserved, the resource management unit 100 stores the tentative reservation request in a wait queue provided for each resource. When the first tentative reservation is discarded because of a tentative reservation cancel request or the expiration of validity time period, a next tentative reservation request that is made for the same resource as the discarded tentative reservation is taken out of the wait queue and rendered a valid tentative reservation. Due to the resource management unit 100 issuing a notification to the another job scheduler 200 that has issued the next tentative reservation request, the another job scheduler 200 recognizes the fact of the valid tentative reservation.

When the tentative reservation request issued by a job scheduler 200 enters any of the wait queues, the job scheduler 200 waits until the tentative reservation becomes valid, and then, starts to create the execution schedule. It is to be noted that, if the tentative reservation does not become valid in a predetermined time period, then at the end of the predetermined time period, the job scheduler 200 starts to create the execution schedule ignoring the tentative reservation request remaining in the wait queue.

With the above configuration and procedures adopted, the job scheduler 200 which issues a tentative reservation request prior to the scheduling of jobs can grasp the reservation state of the resources exactly. Thus, the failure of reservations can be avoided which would be caused by not being able to grasp the exact reservation state of the resources and it is possible to select an optimum combinational operation of resources. The above procedures and functions of the resource management unit 100 and the job scheduler 200 are realized by programs executed by the computers constituting them respectively.

The present invention will be described in more detail with reference further to the example shown in FIG. 5. Each of the resource management units 100, the job schedulers 200, and the user terminals 400 in the distributed resource management system includes a computer on which a program runs. The resources 300 include various apparatuses such as computers, storage units, and network apparatuses. The user terminals 400 each may have a job scheduler 200 incorporated therein. Also the resource management units 100 each may have any number of resources 300 incorporated therein or manage any number of resources disposed outside thereof. The number of the user terminals 400 may be one. The present invention can be applied likewise to a resource management system that includes a single resource management unit 100 and a single job scheduler 200.

Figure 6:
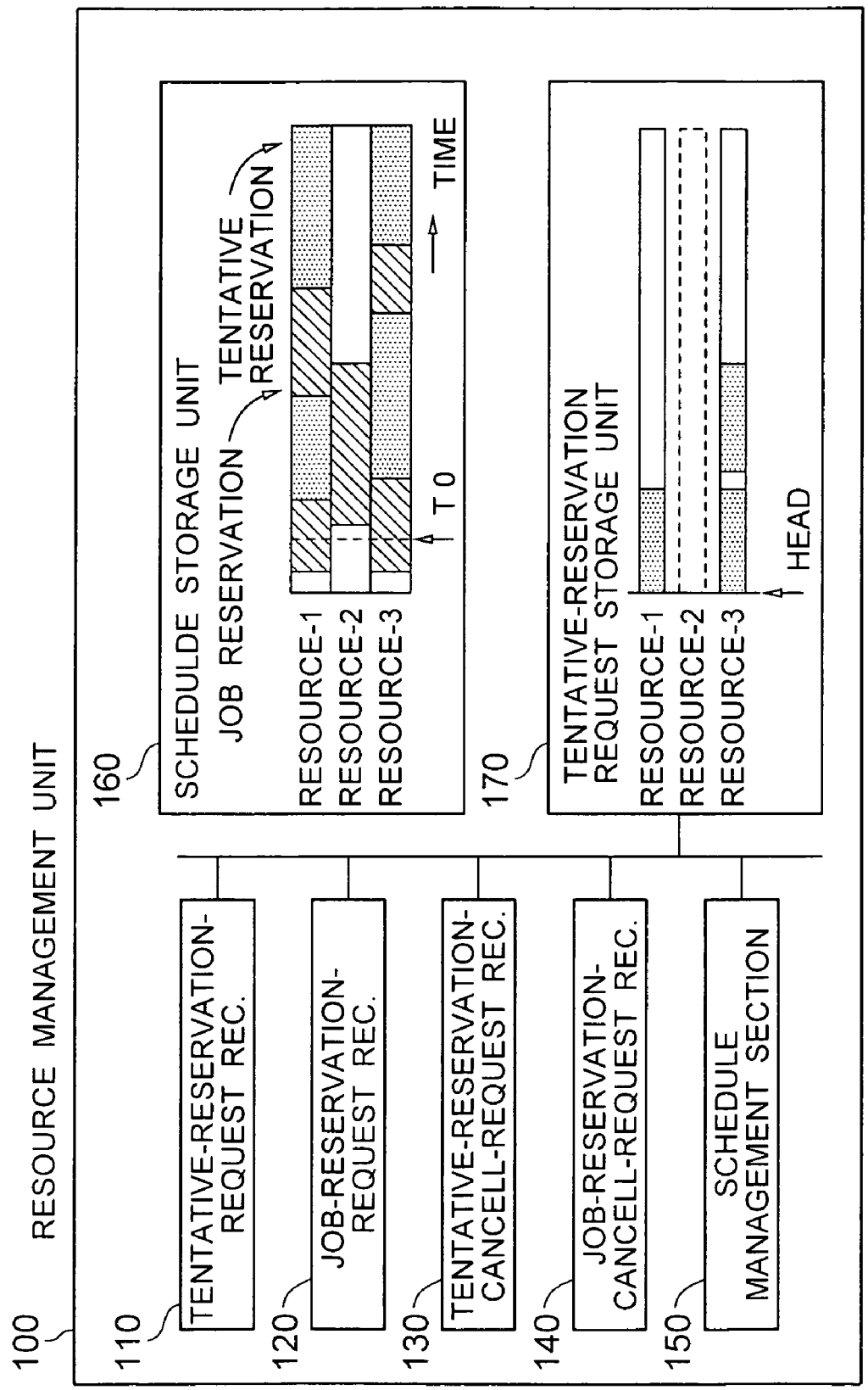
FIG. 6 is a block diagram showing the configuration and states of reservation in the resource management unit 100 in the distributed resource management system of FIG. 5.

Referring to FIG. 6, there is shown the configuration and stored data of the resource management unit 100 shown in FIG. 5, wherein to means the present time instant. The resource management unit 100 includes a tentative-reservation-request receiving section 110, a job-reservation-request receiving section 120, a tentative-reservation-cancel-request receiving section 130, a job-reservation-cancel-request receiving section 140, a schedule management section 150, a schedule storage unit 160, and a tentative-reservation-request storage unit 170.

For each resource managed by the resource management unit 100, the information of time period reserved for each job is stored in the schedule storage unit 160.

The tentative-reservation-request storage unit 170 is provided with a wait queue for each resource managed by the resource management unit 100. In the wait queue, tentative reservation requests issued by job schedulers 200 and waiting for tentatively reserving the resource are stored.

Those sections in the resource management unit 100 as described above operate in the manner outlined as follows. The tentative-reservation-request receiving section 110 receives a tentative reservation request from the job scheduler 200 and adds information of the tentative reservation in the schedule storage unit 160 or the tentative-reservation-request storage unit 170.

The job-reservation-request receiving section 120 receives a job reservation request from the job scheduler 200 and adds information of the job reservation in the schedule storage unit 160. In order to execute the job reservation, the tentative reservation must be registered beforehand in the schedule storage unit 160 via the tentative-reservation-request receiving section 110.

The tentative-reservation-cancel-request receiving section 130 receives a tentative reservation cancel request from the job scheduler 200 and discards information of the corresponding tentative reservation from the schedule storage unit 160 or the tentative-reservation-request storage unit 170. Along with this procedure, a waiting tentative reservation request stored in the tentative-reservation-request storage unit 170 may be moved to the schedule storage unit 160.

The job-reservation-cancel-request receiving section 140 receives a job reservation cancel request from the job scheduler 200, discards information of the corresponding job reservation from the schedule storage unit 160, and releases the resources allocated to the job.

The schedule management section 150 monitors information of the job reservations and the tentative reservations stored in the schedule storage unit 160 and, based on the information of these stored reservations, performs allocation and release of resources and discarding of tentative reservations. The functions of the above-mentioned sections of the resource management unit 100 shown in FIG. 6 can be realized by a program running on a computer constituting the resource management unit 100.

Figure 7:
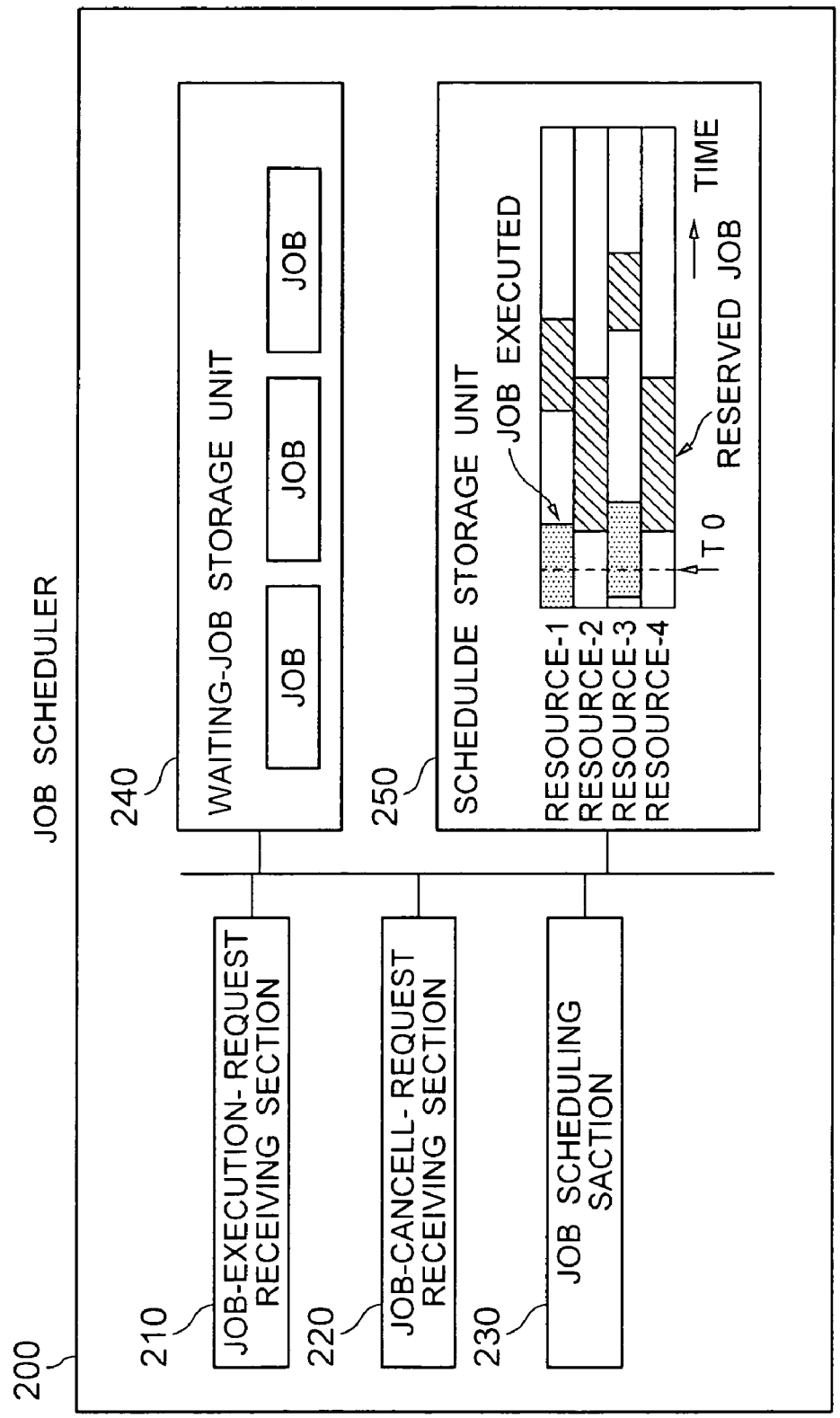
FIG. 7 is a block diagram showing the configuration and stored data in the job scheduler 200 in the distributed resource management system of FIG. 5.

Referring to FIG. 7, there are shown the configuration and stored data of the job scheduler 200 shown in FIG. 5. The job scheduler 200 includes a job-execution-request receiving section 210, a job-cancel-request receiving section 220, a job scheduling section 230, a waiting-job storage unit 240, and a schedule storage unit 250. The waiting-job storage unit 240 temporarily stores information of the jobs input via the user terminal 400. The schedule storage unit 250 stores information of the jobs for which reservations are confirmed, for each resource.

The constituent elements provided in the job scheduler 200 as described above operate in the manner outlined as follows. The job-execution-request receiving section 210 receives a job execution request from the user terminal 400 and adds (or stores) the contents of job information contained in the job execution request in the waiting-job storage unit 240.

The job-cancel-request receiving section 220 receives a job cancel request from the user terminal 400 and discards the corresponding job registered in the waiting-job storage unit 240 or the schedule storage unit 250 and issues a job reservation cancel request to the resource management unit 100.

The job scheduling section 230 periodically takes out the jobs stored in the waiting-job storage unit 240 and assigns those jobs to resources. The assignment of jobs to resources includes the issuing of tentative reservation requests, the creation of a job execution schedule, and the issuing of job reservation requests to the resource management unit 100. The functions of the above-mentioned elements in the job scheduler 200 can be realized by a program running on a computer constituting the job scheduler 200.

Figure 8:
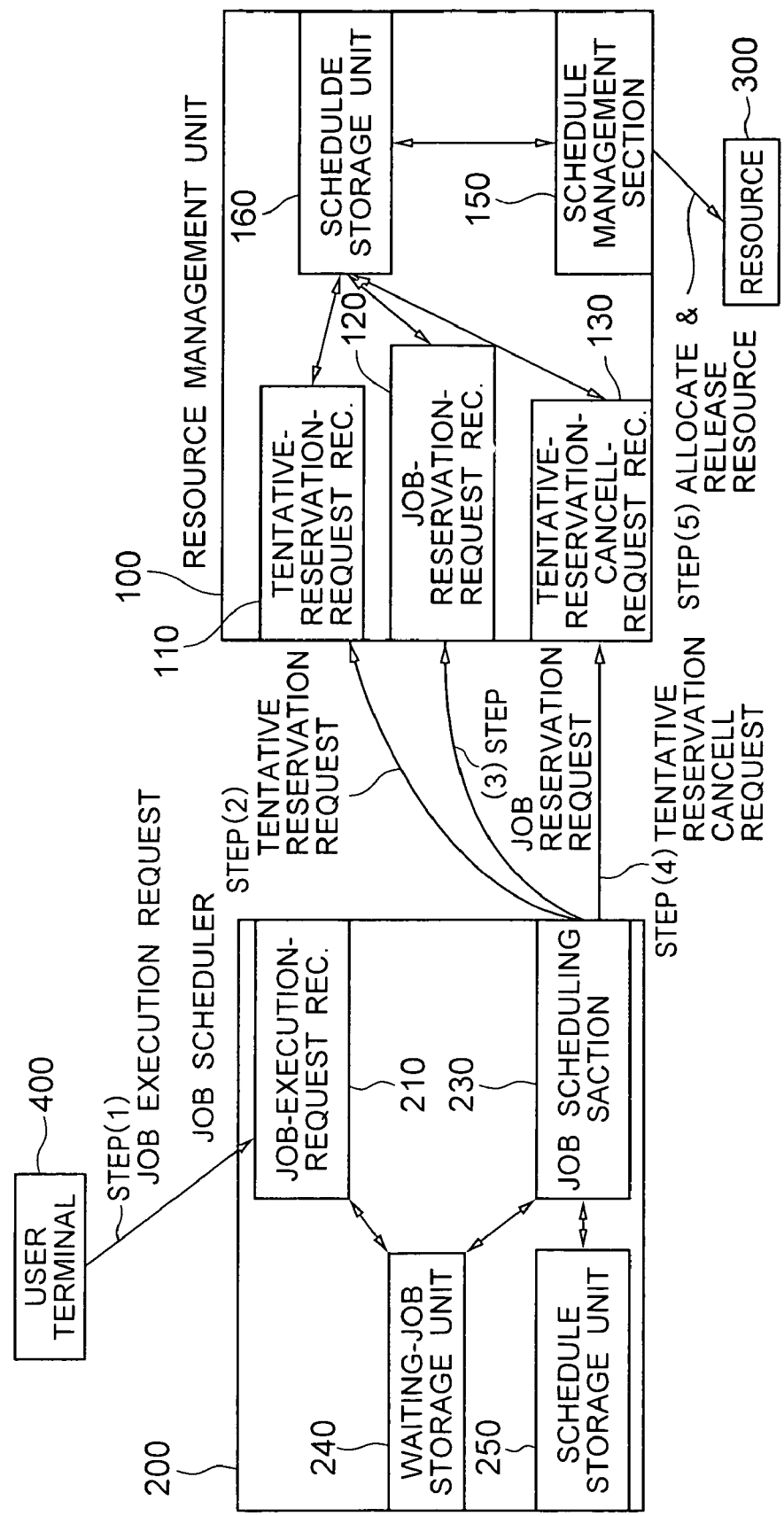
FIG. 8 is a block diagram showing the procedures in the distributed resource management system of FIG. 5.

The outline of the procedures and signal transmission between the resource management unit 100 and the job scheduler 200 will be detailed with reference to FIGS. 8 and 9. FIG. 8 schematically shows the flow of the procedures from the step (1) of user terminal 400 inputting a job (parallel job) into the job scheduler 200 to the step (5) of completion of the job execution on resources.

Step (1): the job-execution-request receiving section 210 in the job scheduler 200 receives a job execution request issued by a user terminal 400 and stores the contents of the job execution request in the waiting-job storage unit 240.

Step (2): the job scheduling section 230 in the job scheduler 200 reads out information of the job from the waiting-job storage unit 240 and issues a tentative reservation request to the tentative-reservation-request receiving section 110 of the resource management unit 100. The tentative-reservation-request receiving section 110 stores information of the tentative reservation in the schedule storage unit 160.

Step (3): after the creation of the job execution schedule is completed, the job scheduling section 230 of the job scheduler 200 issues a job reservation request to the job-reservation-request receiving section 120 in the resource management unit 100. The job-reservation-request receiving section 120 adds information of the job reservation in the schedule storage unit 160.

Step (4): the job scheduling section 230 in the job scheduler 200 issues a tentative reservation cancel request to the tentative-reservation-cancel-request receiving section 130 of the resource management unit 100. The tentative-reservation-cancel-request receiving section 130 removes information of the tentative reservation from the schedule storage unit 160.

Step (5): when it reaches the start time designated by a job reservation stored in the schedule storage unit 160, the schedule management section 150 in the resource management unit 100 allocates reserved resources 300 to the job, and when it reaches the end time designated by the job reservation, releases the resources 300 allocated to the job.

Referring to FIG. 9, there are shown in diagrams (A) to (D) examples of the states of the waiting-job storage unit 240 and the schedule storage unit 250 in the job scheduler 200, during the procedures as described above with reference to FIG. 8.

FIG. 9(A) shows the state immediately after the above step (1) shown in FIG. 8. In the schedule storage unit 250, information of jobs reserved before is stored. In the waiting-job storage unit 240, information of the job received in step (1) is also stored.

FIG. 9(B) shows the state immediately after the above step (2). In the schedule storage unit 250, information of time periods for which tentative reservations were successful is stored. As shown in FIG. 9(B), discontinuous time periods of the same resource may be reserved tentatively.

FIG. 9(C) shows the state immediately before issuing a job reservation request in the above step (3). Information of the scheduled job is added in the schedule storage unit 250; however, at this stage, the reservations are not yet confirmed.

FIG. 9(D) shows the state immediately after the above step (4). The reservations of the resources have been confirmed by the issuing of the job reservation request. Information of the corresponding job is removed from the waiting-job storage unit 240.

Next, the entire operation of the above example will be described in more detail. In the following description, the operation of the resource management unit 100 will be described first, and then the operation of the job scheduler 200 will be described.

First, the operation of each constituent element of the resource management unit 100 will be described in detail.

The tentative-reservation-request receiving section 110 receives a tentative reservation request from the job scheduler 200, and handles the tentative reservation request with reference to the contents of the schedule storage unit 160.

Figure 10:
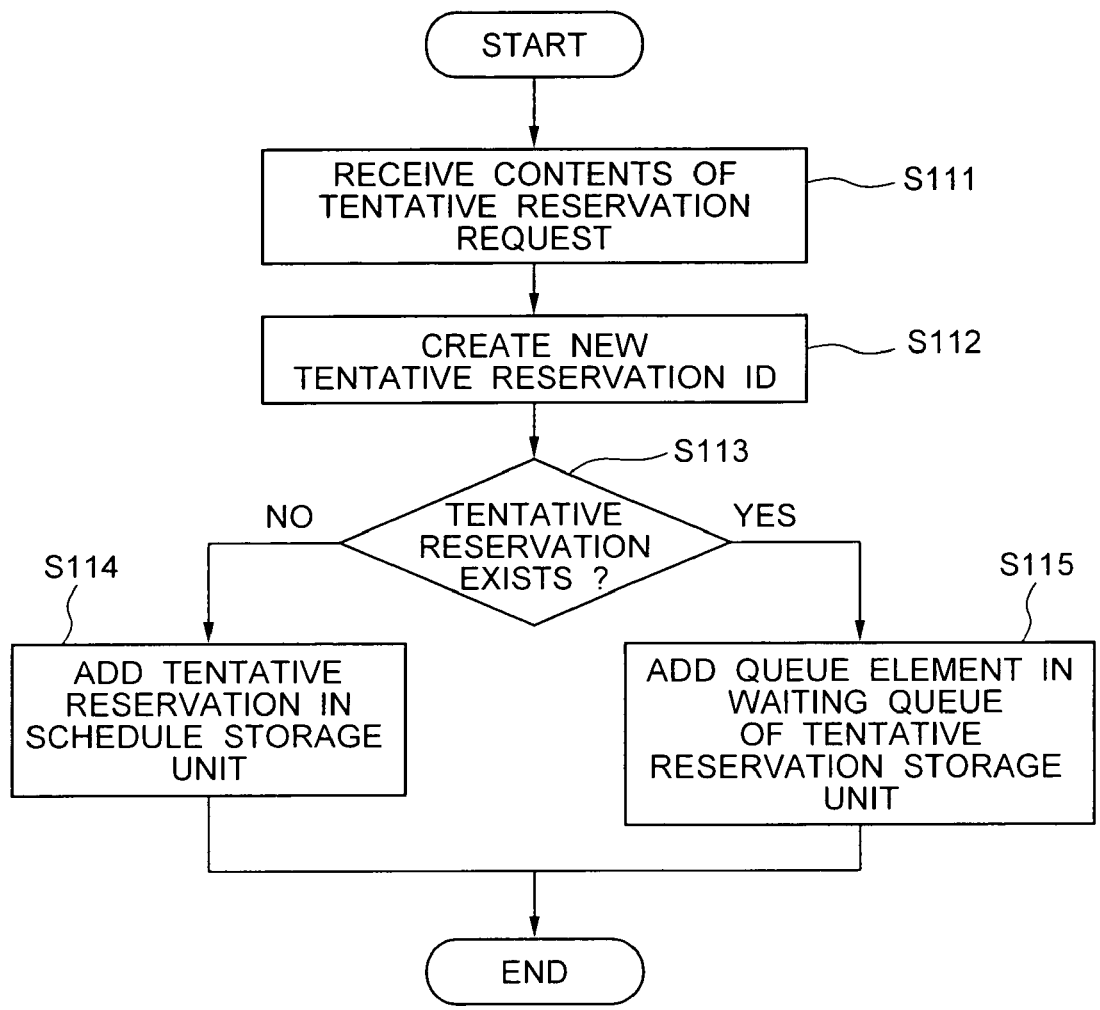
FIG. 10 is a flowchart showing the procedure of a tentative-reservation-request receiving section 110 of the resource management unit shown in FIG. 5.

FIG. 10 shows the procedures by the tentative-reservation-request receiving section 110 in the resource management unit 100. The operation of the tentative-reservation-request receiving section 110 will be described herein with reference to FIGS. 6 and 10.

The tentative-reservation-request receiving section 110 receives request contents from the job scheduler 200 (step S111). The request contents include the ID of the job scheduler 200 having issued the request and the ID of a resource to be tentatively reserved.

Subsequently, the tentative-reservation-request receiving section 110 creates a new tentative reservation ID corresponding to the tentative reservation request (step S112). After that, the tentative reservation and tentative reservation request will be identified based on the tentative reservation ID.

Subsequently, the tentative-reservation-request receiving section 110 refers to the schedule storage unit 160 to check whether or not the resource designated in step S111 has been already reserved tentatively by another job (step S113). If reserved tentatively (YES at step S113), the process advances to step S115. If not reserved tentatively (NO at step S113), the process advances to step S114.

In step S114, information of the new tentative reservation is added in the schedule storage unit 160. The information of the tentative reservation includes a time period to be tentatively reserved, the tentative reservation ID, and the ID of the issuer of the tentative reservation request. The time period to be tentatively reserved is a time period other than the job-reserved time periods among the whole time period of the target resource. The time period to be tentatively reserved for a resource can be limited based on the policy of the system management. A validity time period is attached to the tentative reservation added in the schedule storage unit 160. How to set the validity time period can be determined based on the policy of the system management.

In step S115, the tentative reservation request received is stored as being in a waiting state in the wait queue of the tentative-reservation-request storage unit 170.

Here, the difference between the case of being registered in the schedule storage unit 160 and the case of being registered in the tentative-reservation-request storage unit 170 will be described in detail by using a specific example. In FIG. 11, diagrams (A) to (D) respectively show schedules stored in the schedule storage unit 160 and states of the wait queue of the tentative-reservation-request storage unit 170. In this example, the wait queue is of a FIFO type (First-In First-Out), wherein a queue element is attached to the tail of the queue and taken out from the head of the queue. It is to be noted that, in the present invention, the queue is not limited in configuration to the depicted example.

FIG. 11(A) shows the state where job reservations for job-1 and job-2 have been made in the schedule for a specific resource, and where the wait queue for the same resource in the tentative-reservation-request storage unit 170 is empty.

Since no tentative reservation exists in FIG. 11(A), when a tentative reservation request is received, the process advances to step S114 of FIG. 10, where time periods other than the time periods reserved for the job-1 and job-2 in the schedule are reserved tentatively (refer to "tentative reservation-3" of FIG. 11(B)).

In the state shown in FIG. 11(B), when a new tentative reservation request is received, due to an existing tentative reservation, the process advances to step S115 of FIG. 10, where the tentative reservation request is added in the wait queue.

FIG. 11(C) shows the situation where "tentative reservation request-4" and "tentative reservation request-5" arrived in that order after the state of FIG. 11(B) and are stored in the wait queue.

After the state shown in FIG. 11(C), if "tentative reservation-3" is discarded due to the expiration of validity time period or a tentative reservation cancel request, "tentative reservation request-4" stored at the head of the wait queue is registered in the schedule (FIG. 11(D)).

The process that moves a tentative reservation from the wait queue to the schedule will be described in the operation procedures of the tentative-reservation-cancel-request receiving section 130 and the schedule management section 150, which will be described later.

Next, the operation of the job-reservation-request receiving section 120 of the resource management unit 100 will be described in detail.

The job-reservation-request receiving section 120 receives a job reservation request from the job scheduler 200, and registers the job reservation in the schedule storage unit 160. The job reservation request received from the job scheduler 200 includes the ID of a job scheduler 200 having issued the request, the ID of a user wishing execution of the job, the IDs of resources to be reserved, the start time and end time of the time period to be reserved, and a job ID to be used for identification of the job reservation.

It is to be noted that a previously-issued tentative reservation ID may be used to designate the ID of a resource to be reserved, or alternatively, that the job-reservation-request receiving section 120 may issue a new job ID without using the job ID included in the job reservation request.

In order that a job reservation request is successful, the time period to be job-reserved must be included in the time period tentatively reserved, and the issuer of the tentative reservation request corresponding to the tentative reservation must match with the issuer of the job reservation request. When these conditions are satisfied, the contents of the job reservation request received are registered in the schedule storage unit 160.

Figure 12:
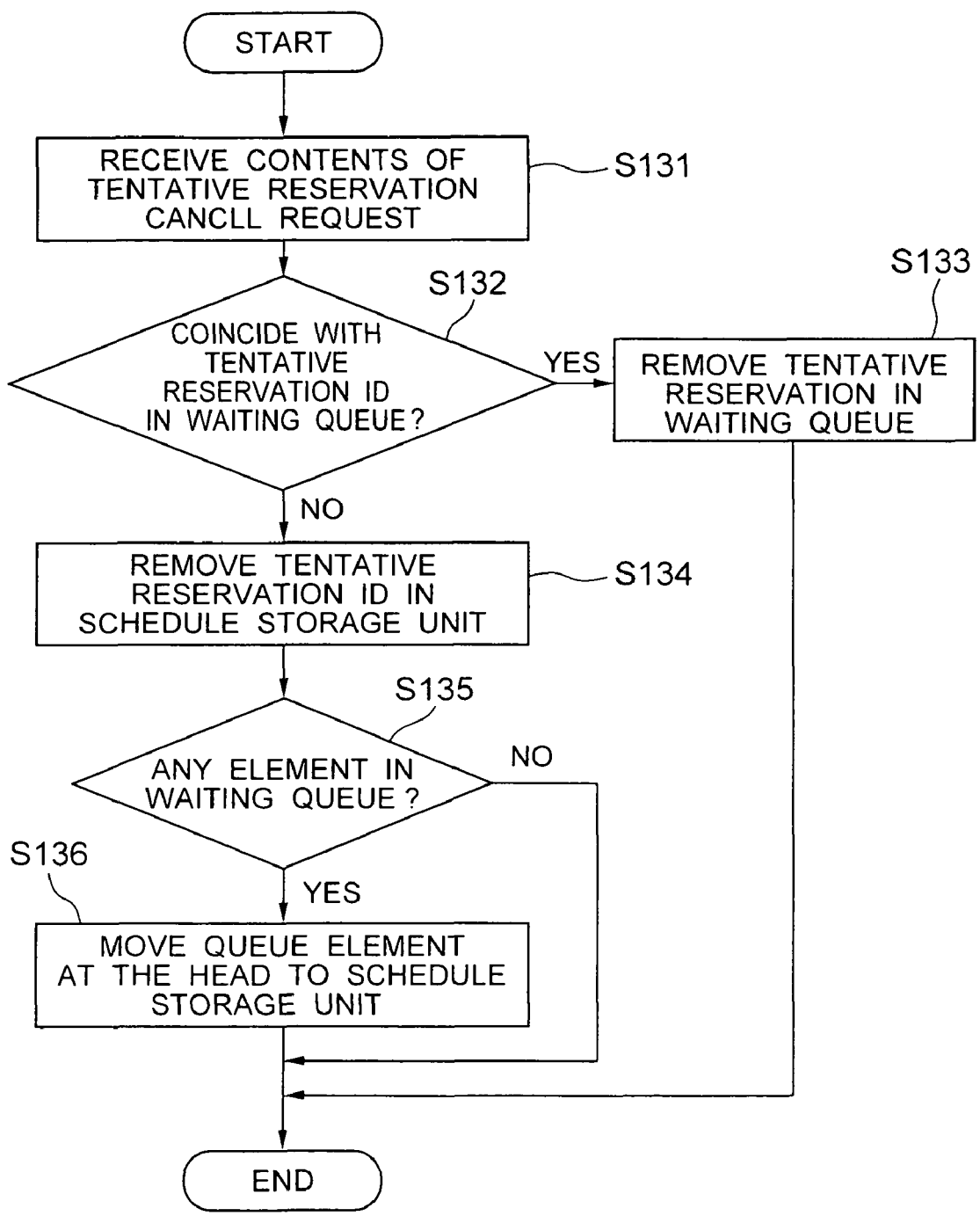
FIG. 12 is a flowchart showing the procedure of the tentative-reservation-cancel-request receiving section 130 of the resource management unit shown in FIG. 5.

FIG. 12 is a flowchart showing the operation of the tentative-reservation-cancel-request receiving section 130 of the resource management unit 100. The operation of the tentative-reservation-cancel-request receiving section 130 will be described with reference to FIGS. 6 and 12. The tentative-reservation-cancel-request receiving section 130 receives a tentative reservation cancel request from a job scheduler 200 and discards the tentative reservation stored in the schedule storage unit 160 or the tentative reservation request stored in the tentative-reservation-request storage unit 170.

More specifically, the tentative-reservation-cancel-request receiving section 130 receives request contents (step S131). The request contents include the ID of the job scheduler having issued the request and a tentative reservation ID to identify a corresponding tentative reservation/tentative reservation request to be cancelled. If the corresponding tentative reservation/tentative reservation request does not exist, or the job scheduler having issued the tentative reservation request and the job scheduler having issued the tentative reservation cancel request are different, then the tentative reservation cancel request fails.

It is determined whether or not the tentative reservation ID received in step S131 corresponds to an element of the wait queue in the tentative-reservation-request storage unit 170 (step S132). As a result of the determination, if the tentative reservation ID received corresponds to a tentative reservation request in the wait queue (YES at step S132), the queue element is removed from the wait queue and the process finishes (step S133). If not (NO at step S132), that is, the tentative reservation ID corresponds to a tentative reservation in the schedule storage unit 160, the series of steps starting at step S134 are performed. In step S134, the tentative reservation corresponding to the tentative reservation ID is removed from the schedule storage unit 160.

Subsequently, it is checked whether or not there is an element in the wait queue for the resource for which the tentative reservation removed in step S134 is directed, in the tentative-reservation-request storage unit 170 (step S135). If it is found, as a result of the checking, that the wait queue is empty (NO at step S135), the process finishes. If the wait queue is not empty (YES at step S135), the process advances to step S136.

In step S136, the queue element stored at the head of the wait queue is moved to the schedule storage unit 160 (refer to FIGS. 11(C) and 11(D)).

The process of determining a time period to be tentatively reserved is similar to that in the above step S114. In addition, information of the tentative reservation request, which was waiting, having been executed is notified to the job scheduler 200 which issued the tentative reservation request. Hereinafter, this notification is called "tentative reservation success notification".

Next, the operation of the job-reservation-cancel-request receiving section 140 of the resource management unit 100 will be described in detail. The job-reservation-cancel-request receiving section 140 receives a job reservation cancel request from a job scheduler 200 and discards the corresponding job reservation. The job reservation cancel request includes the ID of the job scheduler having issued the request and the job ID of a job reservation to be cancelled.

In order that a job reservation cancellation is successful, the job reservation corresponding to the job ID included in the job reservation cancel request must be registered beforehand in the schedule storage unit 160, and the issuer of the job reservation request must match with the issuer of the job reservation cancel request. When these conditions are satisfied, information of the corresponding job is removed from the schedule storage unit 160. Furthermore, when a resource is already allocated to the corresponding job, the job-reservation-cancel-request receiving section 140 releases the resource, which is to be used by the job. The process of releasing the resource is similar to the process of releasing a resource by the schedule management section 150, which is described hereinafter.

The operation of the schedule management section 150 in the resource management unit 100 will be described in detail. The schedule management section 150 performs, based on the reservation information stored in the schedule storage unit 160, the following procedures:

Allocating a resource to a job for which it has reached the reserved start time.

Releasing the resource from the job for which it has reached the reserved end time.

3. Discarding the tentative reservation that is no longer valid.

The allocation of a resource as described above refers to making the reserved resource be in an actually usable state, and the actually performed process varies depending on the kind of resource to be managed. For example, when the resource is a computer, the process is the start of a user program; when it is a storage unit, the opening of a remote file; and when it is a network apparatus, the allocation of a band.

The release process of a resource as described above refers to returning the resource allocated to a job through the resource allocation process to be in an unusable state so as to enable the allocation to another job. An example of the resource release process is, for example, the stop of a user program, the closing of a remote file, or the release of band allocation.

The discard of a tentative reservation as described above refers to a process for removing the tentative reservation stored in the schedule storage unit 160 having a validity time period already expired. Moreover, if a non-empty wait queue for a resource, for which the tentative reservation to be discarded is directed, exists in the tentative-reservation-request storage unit 170, then a tentative reservation request stored as the queue element at the head thereof is registered in the schedule storage unit 160, and a tentative reservation success notification is issued to the job scheduler 200. This process is similar to that in the above step S136 of FIG. 12.

Next, the operation of each constituent element of the job scheduler 200 will be described in detail. First, the operation of the job-execution-request receiving section 210 will be described in detail.

The job-execution-request receiving section 210 receives a job execution request from the user terminal 400, and adds the same to the waiting-job storage unit 240. The job execution request includes the ID of a user having issued the request and the description of resources to be used. The description of resources to be used includes the types of resources such as a "computer" and a "storage unit", requirements for performance such as a CPU performance, and dependencies in allocating a plurality of resources. When receiving the job execution request, the job-execution-request receiving section 210 creates a new job ID, and adds the same together with the contents of the job execution request in the waiting-job storage unit 240. The added job is set in a waiting state. Furthermore, the created job ID is notified to the user terminal 400 having issued the job execution request.

Figure 13:
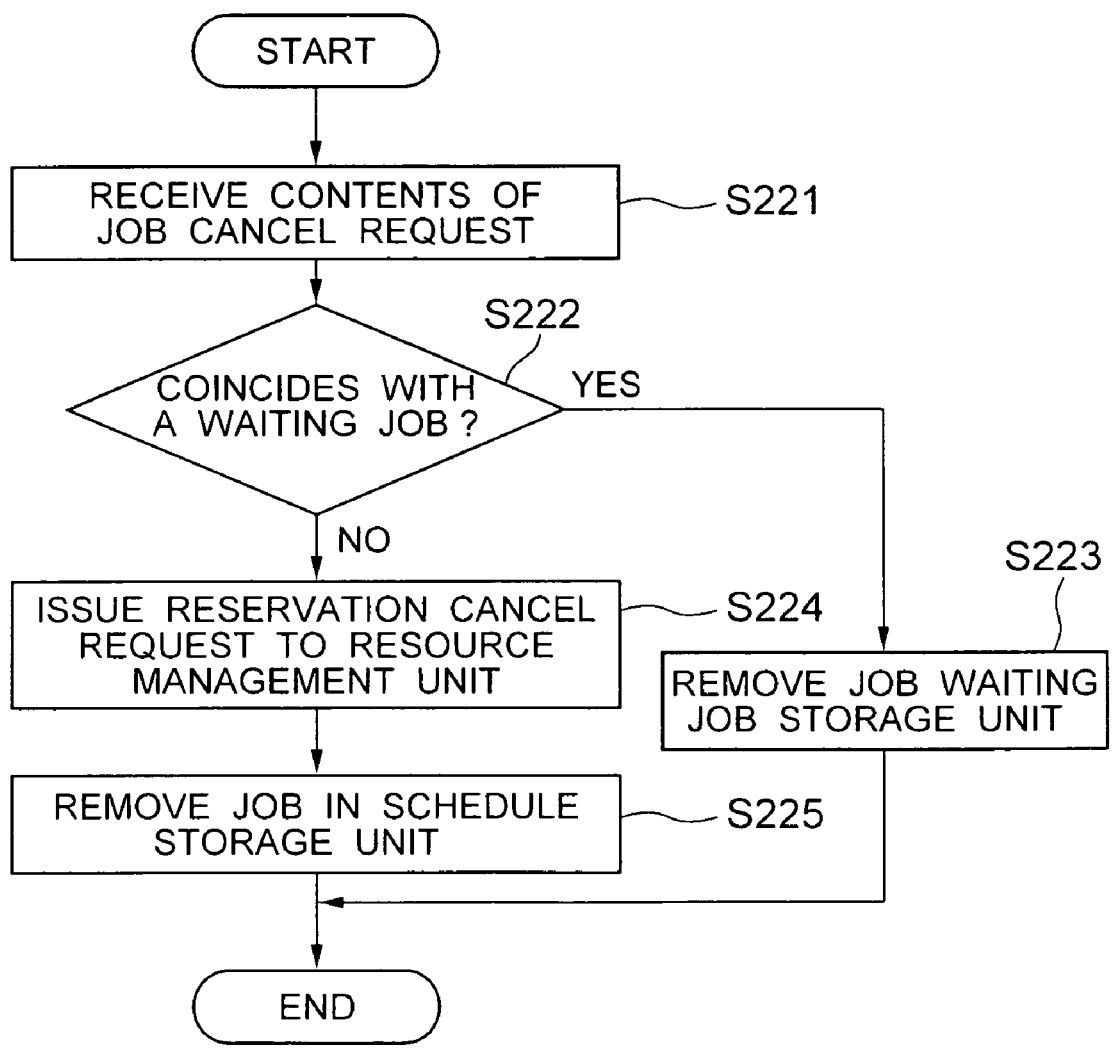
FIG. 13 is a flowchart showing the procedure of the job-cancel-request receiving section 220 of the job scheduler shown in FIG. 5.

Referring to FIG. 13, there is shown a flowchart for depicting the operation of the job-cancel-request receiving section 220 of the job scheduler 200. The operation of the job-cancel-request receiving section 220 will be described with reference to FIGS. 7 and 13. First, job-cancel-request receiving section 220 receives request contents from a user terminal 400 (step S221). The request contents include the ID of a user having issued the job cancel request and the ID of a job to be cancelled. If the user having issued the job cancel request and the user having issued the execution request for the job do not match, then the job cancel request is refused.

Next, with reference to the data stored in the waiting-job storage unit 240 and the schedule storage unit 250, the job-cancel-request receiving section 220 checks in which the information of the job corresponding to the job ID is stored (step S222). If it is found as a result of the checking that the waiting-job storage unit 240 contains the information (YES at step S222), step S223 is executed. If the schedule storage unit 250 contains the information (NO at step S222), steps S224 and S225 are executed. If neither section contains the information, the job cancel request fails.

In step S223, the information of the job is deleted from the waiting-job storage unit 240 and the process finishes.

On the other hand, in step S224, the job-cancel-request receiving section 220 issues a job reservation cancel request to the resource management unit 100 through which a reservation for the job was made. The information of which resources are reserved for the job is acquired from the schedule storage unit 250.

In step S225, the job is deleted from the schedule storage unit 250 and the process finishes.

Figure 14:
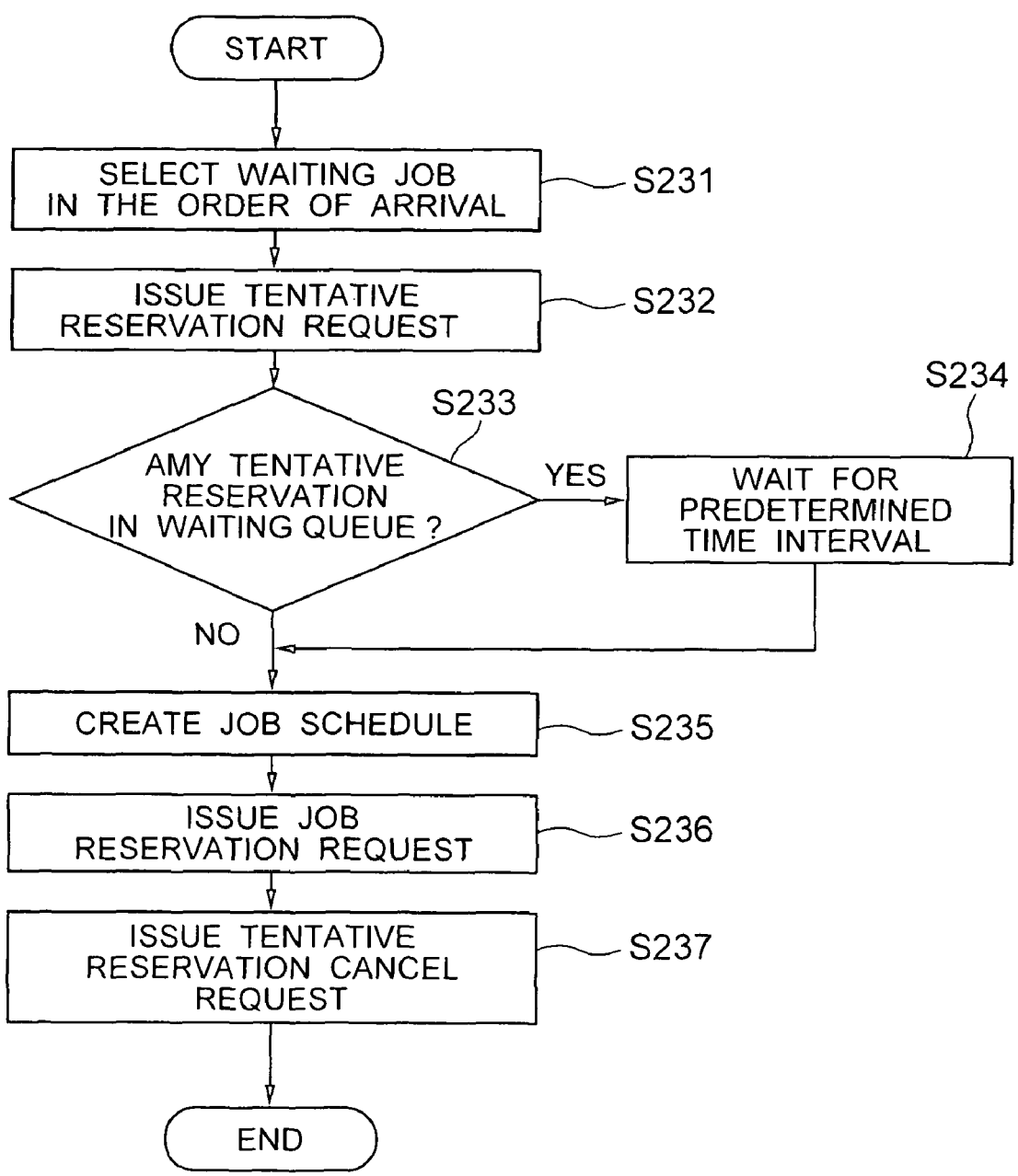
FIG. 14 is a flowchart showing the procedure of the job scheduling section 230 of the job scheduler shown in FIG. 5.

Referring to FIG. 14, there is shown a flowchart depicting the operation of the job scheduling section 230 of the job scheduler 200. The operation of the job scheduling section 230 will be described with reference to FIGS. 7 and 14. The job scheduling section 230 monitors the contents of the waiting-job storage unit 240 regularly and when finding a job in a waiting state, performs the following scheduling process.

First, the job scheduling section 230 takes out jobs to be scheduled in the order of arrival from among the waiting jobs stored in the waiting-job storage unit 240 (step S231). The number of jobs taken out is designated according to the policy in terms of system management.

Next, the job scheduling section 230 issues a tentative reservation request to a resource management unit 100 that manages resources to which the jobs taken out in step S231 can be assigned (step S232).

Next, the job scheduling section 230 checks whether or not there is a tentative reservation request stored in the tentative-reservation-request storage unit 170 in step S232 (step S233). If it is found that a tentative reservation request exists (YES at step S233), the process advances to step S234, and if not (NO at step S233), the process advances to step S235.

In step S234, the job scheduling section 230 waits, for a predetermined time interval, for a tentative reservation success notification to arrive from the resource management unit 100. The wait time is determined based on the policy in terms of system management, and must be at least shorter than the validity time period of the tentative reservation. Either if the predetermined time interval has passed, or if a tentative reservation success notification has arrived for all the tentative reservation requests in a waiting state, the process advances to step S235.

In step S235, the job scheduling section 230 creates a schedule to execute the jobs for the resources, the tentative reservations of which were successful. Creation of an execution schedule refers to the process to determine to which resources and for which time period of the each job is to be assigned.

The known job scheduling algorithm described in, for example, the above second non-patent literature may be applied to this process.

Algorithm D (known as "min-min") proposed in the above second non-patent literature may be preferably used. It is to be noted that if a tentative reservation request stored in the tentative-reservation-request storage unit 170 in step S232 has not received a tentative reservation success notification, then the resources to which the tentative reservation request is directed are not included in the resources to be scheduled.

Next, according to the execution schedule created in step S235, the job scheduling section 230 issues a job reservation request to each resource management unit 100 (step S236). The jobs for which job reservations were successful are moved from the waiting-job storage unit 240 to the schedule storage unit 250.

Finally, the job scheduling section 230 issues a tentative reservation cancel request to the resource management unit 100 for the resources to which the tentative reservation requests were issued in step S232 (step S237).

Resources, to which a tentative reservation cancel request is directed, include resources to which a corresponding tentative reservation request stored in the tentative-reservation-request storage unit 170 is directed.

Preferred Embodiments

In order to describe the present invention in more detail, the following two specific embodiments will be described. The first embodiment is an example where the present invention is applied to the type of distributed resource system called "Grid Data Farm".

Figure 15:
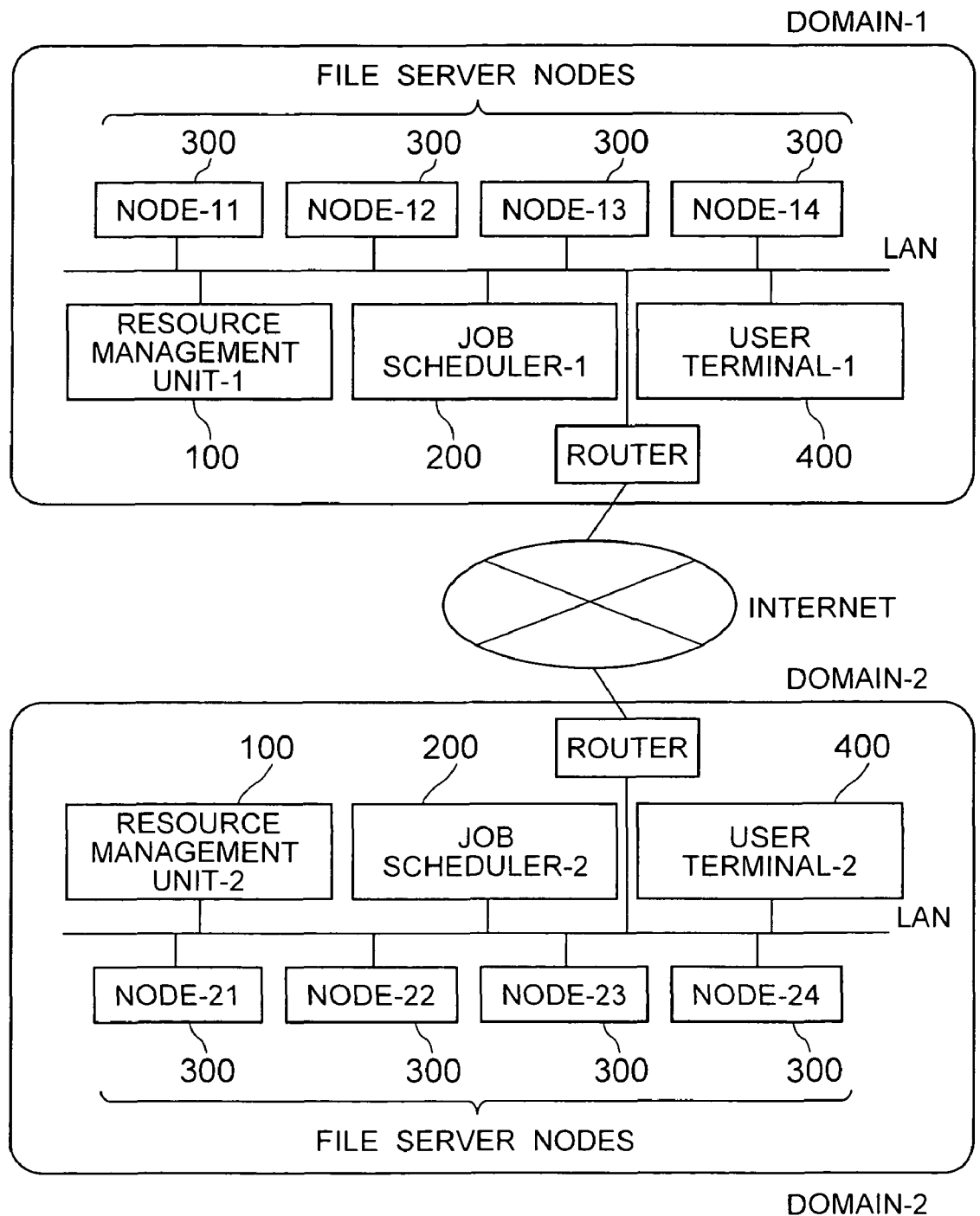
FIG. 15 is a block diagram showing the configuration of a distributed resource management system according to a first embodiment of the present invention.

Referring to FIG. 15, a distributed resource management system according to the first embodiment includes two domains connected together via the Internet, and the constituent elements in each domain are connected together through a local area network (LAN). The constituent elements in the domain-1 include a job scheduler-1 200, a resource management unit-1 100, a user terminal-1 400, and four file server nodes 300 (hereinafter, each simply referred to as "node") including node-11 to node-14. The resource management unit-1 100 manages the node-11 to node-14 300.

The constituent elements in the domain-2 include a job scheduler-2 200, a resource management unit-2 100, a user terminal-2 400, and node-21 to node-24 300. The resource management unit-2 100 manages the node-21 to node-24 300. Each of the file server nodes is a computer having a disk apparatus incorporated therein, and constitutes a distributed file server that divides a file into a plurality of pieces and stores one of them. Furthermore, the file server node also functions as a computing node and executes jobs in parallel to handle the pieces of files stored therein.

Figure 16:
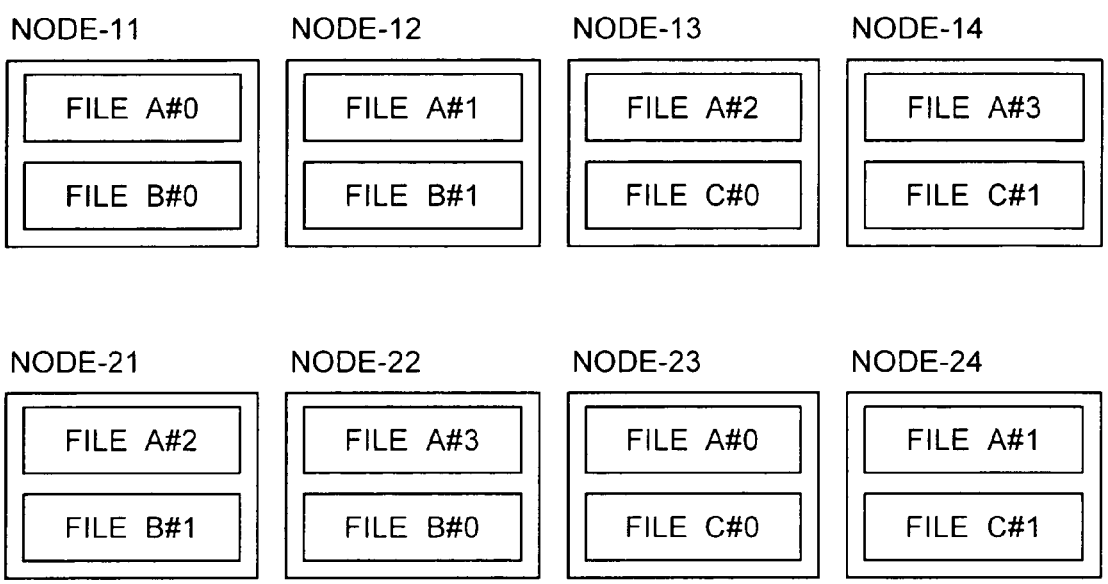
FIG. 16 is schematic diagram showing the states of a plurality of file server nodes in the first embodiment of the present invention.

Referring to FIG. 16, there is shown the configuration of the pieces of files stored in each node. For example, node-11 300 of FIG. 15 stores piece #0 of file-A, i.e., file A#0, and piece #0 of file-B, i.e., file B#0. In FIG. 16, there are three files, files-A, -B, and -C, where file-A consists of four pieces #0 to #3, and files-B and -C each consists of two pieces #0 and #1.

Procedures of the distributed resource management system shown in FIG. 15 and having the above configuration will be described hereinafter for the case where the following two jobs are executed in the system.

Job-1: file A is an object to be processed; a user-1 of FIG. 15 inputs the job to the job scheduler-1 200 via a user terminal-1 400.

Job-2: file B is an object to be processed; another user-2 inputs the job to the job scheduler-2 200 via a user terminal-2 400.

Either of job-1 and job-2 is executed as being a parallel job using four nodes. Hence, all nodes concerned with the execution of each job must be reserved for the same time period.

When the job is input to each job scheduler, the job is once stored in the waiting-job storage unit 240 shown in FIG. 7, followed by allocation of the resources by the job scheduling section 230 shown in FIG. 7.

The job scheduler-2 200 issues a tentative reservation request for resources that are to be used for the execution of job-2. Since job-2 has file-B as an object to be processed, and the nodes storing the pieces of file-B are four nodes, node-11, node-12, node-21 and node-22 as depicted in FIG. 16, the job scheduler-2 200 issues a tentative reservation request for these four nodes. Since no other tentative reservation exists at this stage, the tentative reservations of these nodes for the whole time intervals are completely successful. The job scheduler-2 200 starts for creating the execution schedule as to job-2.

Figure 17:
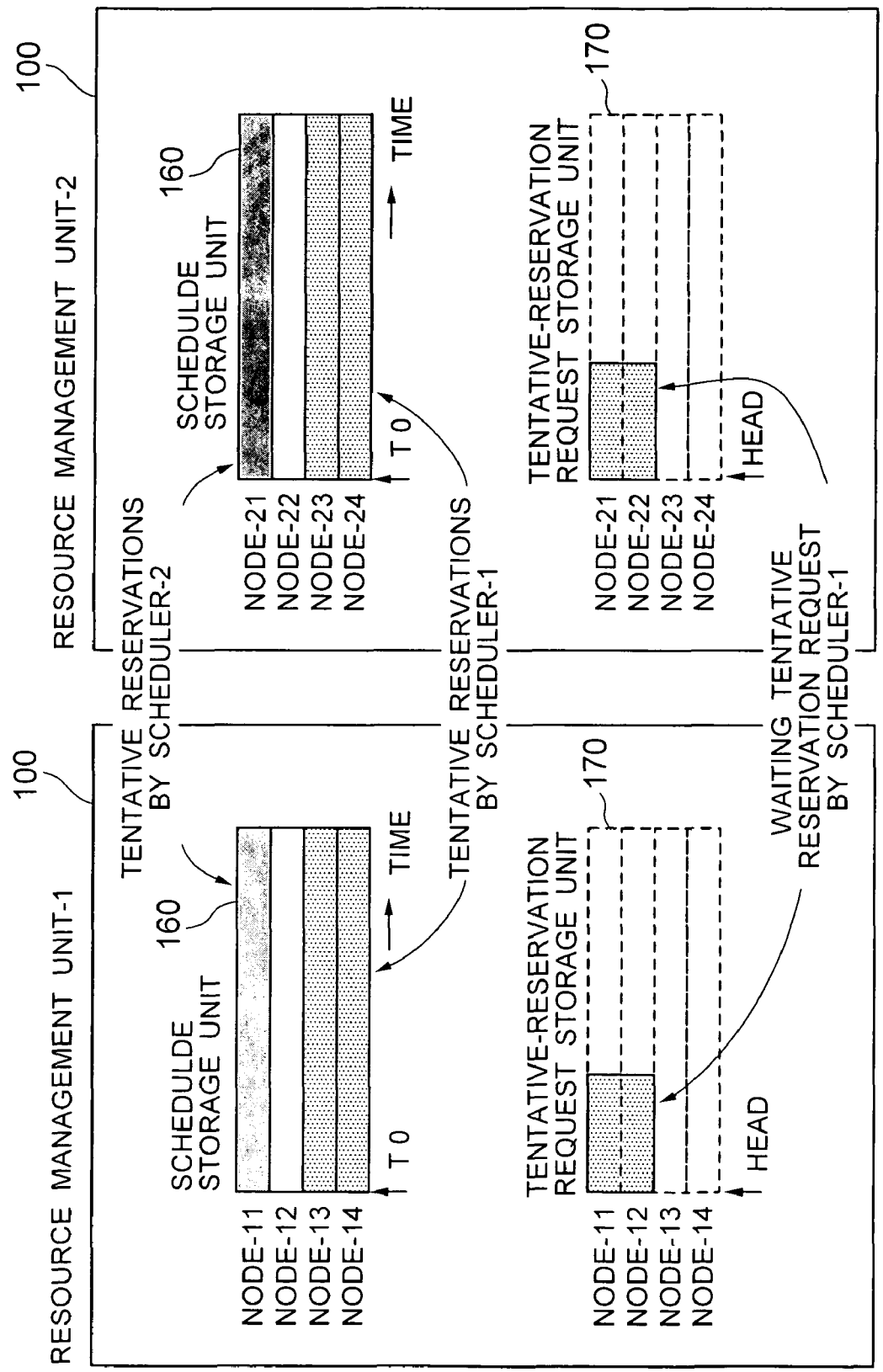
FIG. 17 is a schematic block diagram showing a job scheduling procedure in the resource management units in the first embodiment of the present invention.

The job scheduler-1 200 issues a tentative reservation request for resources that are to be used for the execution of job-1. Job-1 has file-A as an object to be processed, and the nodes storing the pieces of file-A are eight nodes, node-11 to node 14 and node-21 to node-24 as depicted in FIG. 16. Thus, the job scheduler-1 200 issues a tentative reservation request for these nodes. Since node-11, node-12, node-21 and node-22 have been tentatively reserved by the job scheduler-2 200 at this stage, the tentative reservations of only node-13, node-14, node-23 and node-24 are successful, and for the other four nodes, the tentative reservation request is stored in the wait queues. Therefore, until either a predetermined time period has passed or a tentative reservation success notification has arrived, the scheduling is suspended. Referring to FIG. 17, there are shown the contents stored in the schedule storage unit 160 and the tentative-reservation-request storage unit 170 of each resource management unit 100 at this stage.

Figure 18:
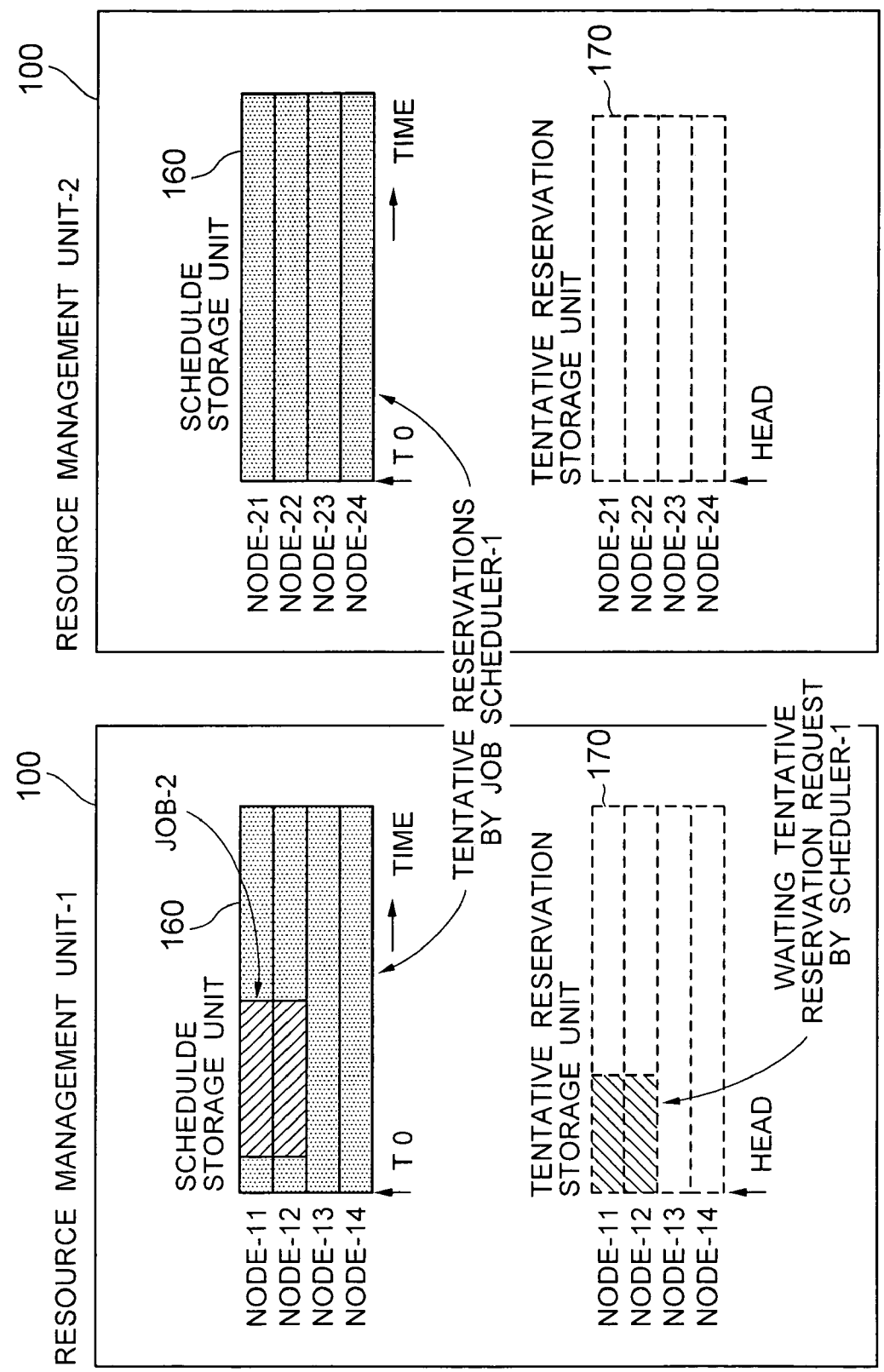
FIG. 18 is a schematic block diagram showing another job scheduling procedure in the resource management units in the first embodiment of the present invention.

Thereafter, the job scheduler-2 200 finishes creation of the execution schedule for job-2, and issues a job reservation request to each of the resource management units 100, unit-1 and unit-2, and subsequently a tentative reservation cancel request. As a result, the assignment of job-2 to node-11 and node-12 is confirmed, and the tentative reservations of node-21 and node-22 are discarded. Thus, the tentative reservation requests issued by the job scheduler-1 as to node 21 and node-22 re taken out of the wait queues, and these nodes are set in a tentatively reserved state by the resource management unit-2. FIG. 18 shows the contents stored in the schedule storage unit 160 and the tentative-reservation-request storage unit 170 of each resource management unit 100 at this stage.

Next, the job scheduler-1 200 receives tentative reservation success notifications from the resource management units 100, unit-1 and unit-2, as to nodes-13, -14, 21, 22, 23 and 24 and starts for creating the execution schedule for the job-1. The job scheduler-1 200 selects in this case the four nodes, node-21, node-22, node-23 and node-24, all of which exist in the domain-2 and for which the time interval until the start of execution is short, and issues a job reservation request for these selected nodes. After the job reservations finish, the job scheduler-1 200 issues a tentative reservation cancel request to the resource management units 100, unit-1 and unit-2.

FIG. 19 shows the final scheduling result. In this example, although the tentative reservation requests from the job scheduler-1 and job scheduler-2 are in conflict, the job scheduling is suitably finished without the occurrence of request failure.

The above procedure is only an example, and the scheduling result may differ depending on the order, in which the jobs are input, as well as a communication delay. Even in that case, the scheduling finishes without a problem.

Consider the case of a distributed resource management system of a comparative example having a similar configuration except for the tentative reservation system of the embodiment. When job reservations by the job scheduler-2 200 are executed first, the node-11 and node-12 are reserved for job-2. Thereafter, the job scheduler-1 200 makes a job reservation for job-1, at which time not knowing information of job-2, the job scheduler-1 200 may try to make a job reservation of node-11 to node-14. In this case, reservations of only node-13 and node-14 are successful, and thus other two nodes need to be searched for separately.

As a result, the scheduling result shown in FIG. 20 will be obtained in the comparative example, and is lower in the usability of resources than the scheduling result shown in FIG. 19, because job-1 is assigned to resources on both sides of WAN.

Figure 21:
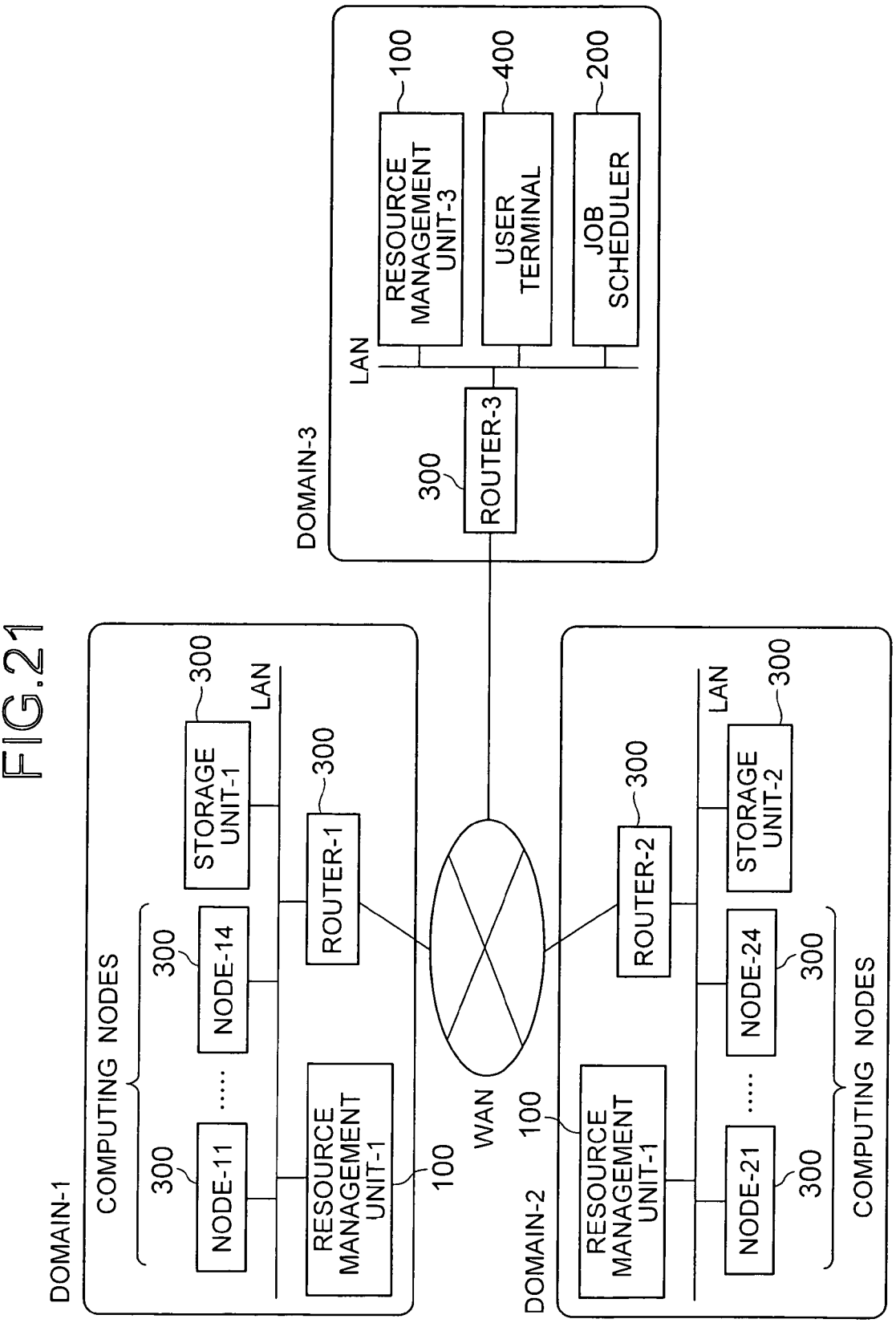
FIG. 21 is a block diagram showing the configuration of a distributed resource management system according to a second embodiment of the present invention.

A distributed resource management system according to the second embodiment of the present invention will be now described. The second embodiment is an example of the case of executing two jobs having a dependency therebetween. Referring to FIG. 21, the distributed resource management system of the present embodiment includes three domains, domain-1, domain-2 and domain-3, connected via a WAN, and the constituent elements in each domain are connected through a LAN. The LAN in domain-1 is connected to a resource management unit-1 100 and managed resources 300 that include a router-1 300, four computing nodes 300, node-11 to node-14, and a storage unit-1 300. The LAN in domain-2 is connected to a resource management unit-2 100 and managed resources 300 that include a router-2 300, four computing nodes 300, node-21 to node-24, and a storage unit-2 300. The LAN in domain-3 is connected to a resource management unit-3 100 and managed resources that include a router-3 300, a user terminal 400, and a job scheduler 200. The router 300, the computing nodes 300, and the file server (not shown) in each domain are subject resources managed by the resource management unit 100 in the each domain. The router of each domain has a band reservation function and can reserve a band necessary for communication for a specific job. When a resource management unit 100 is requested to reserve a network band, the resource management unit 100 performs a band reservation operation on the corresponding router.

The storage units of the domain-1 and domain-2 are implemented as network storage units from and into which data can be read and written via a network (LAN or WAN).

It is assumed here that the following two jobs are input through the user terminal for execution in the distribution resource management system of the present embodiment.

Job-1: computing using eight computing nodes and writing the result into file-A stored in any storage unit, the writing of the computing result into the storage unit needing a network band of 10 Mbps.

Job-2: reading data from file-A stored in the any storage unit and visualizing the contents of the file-A using two computing nodes, and transmitting the resultant image data to the user terminal, the reading of file-A needing a network band of 10 Mbps, and the transmission of the image data needing a network band of 1 Mbps.

Figure 22:
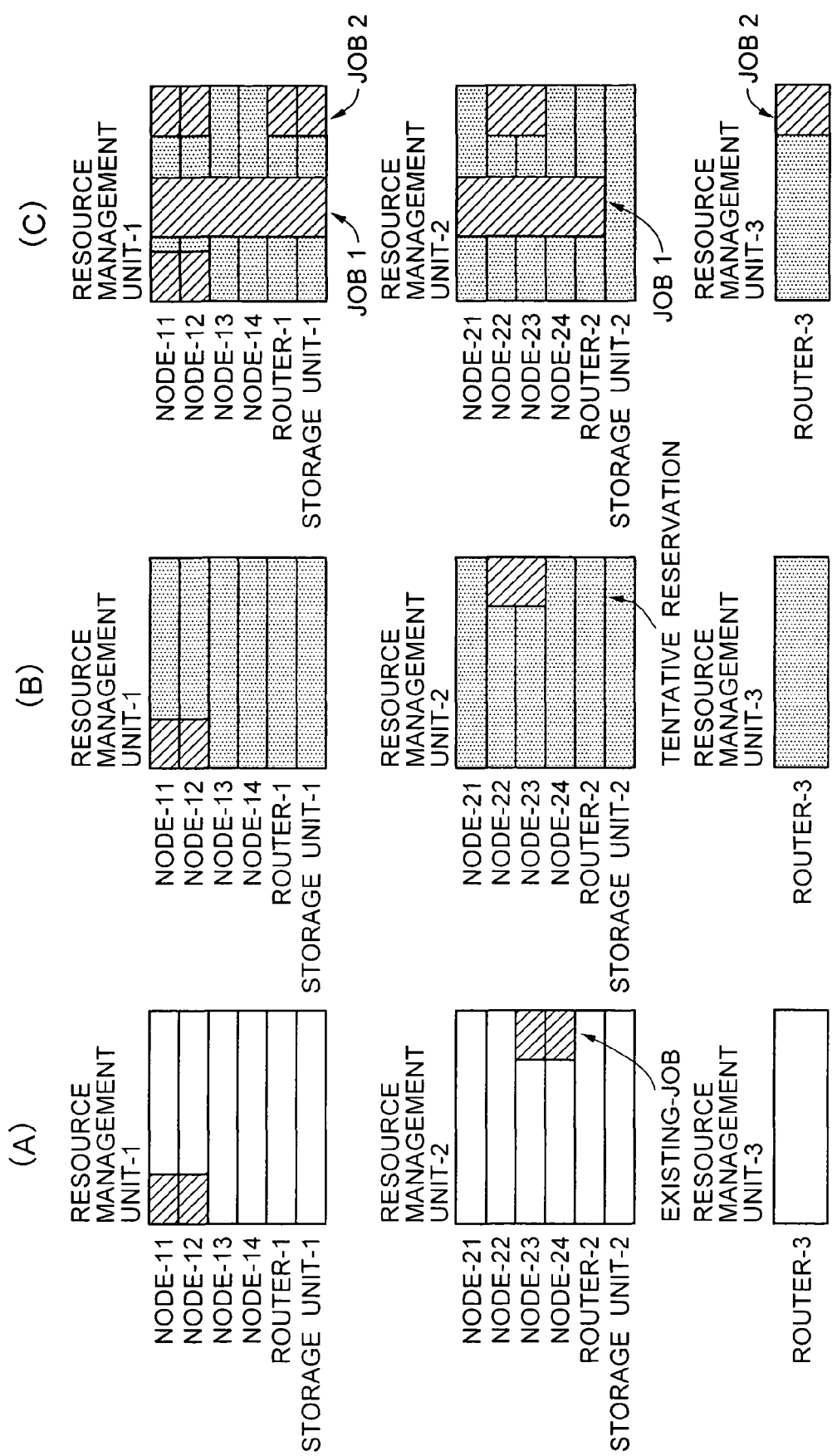
FIG. 22 includes a plurality of schematic diagrams each showing job scheduling in the second procedure in the resource management units in the second embodiment of the present invention.

The procedures for the case where the above jobs are input will be described below with reference to FIG. 22, which shows, in diagrams A, B and C thereof, the contents of the schedule storage units in the resource management units, unit-1 to unit-3, at respective stages.

FIG. 22(A) shows the stage before the start of scheduling. In this state, job reservations already exist on node-11, node-12, node-22 and node-23.

After receiving job execution requests for job-1 and job-2 from the user terminal 400, the job scheduler 200 in domain-3 starts for allocation by the job scheduling section 230 (refer to FIG. 7). First, the job scheduler 200 issues tentative reservation requests for resources managed by the resource management units 100, unit-1, unit-2 and unit-3 in each domain.

FIG. 22(B) shows the contents stored in the schedule storage unit 160 in each resource management unit after the completion of the tentative reservations by the job scheduler 200.

The job scheduler 200 selects resources and time periods to which job-1 and job-2 are to be assigned. Here, the restrictions that writing data into file-A by job-1 must precede reading file-A by job-1 and that the storage unit used in reading file-A by job-2 be the same storage unit as used in writing file-A by job-1.

According to the execution schedule created, job reservation requests are issued to the resource management unit of each domain, and thus the reservation state shown in FIG. 22(C) is obtained.

If the job reservations are successful, the job scheduler 200 issues tentative reservation cancel requests to the resource management unit of each domain, to discard the tentative reservations.

Figure 23:
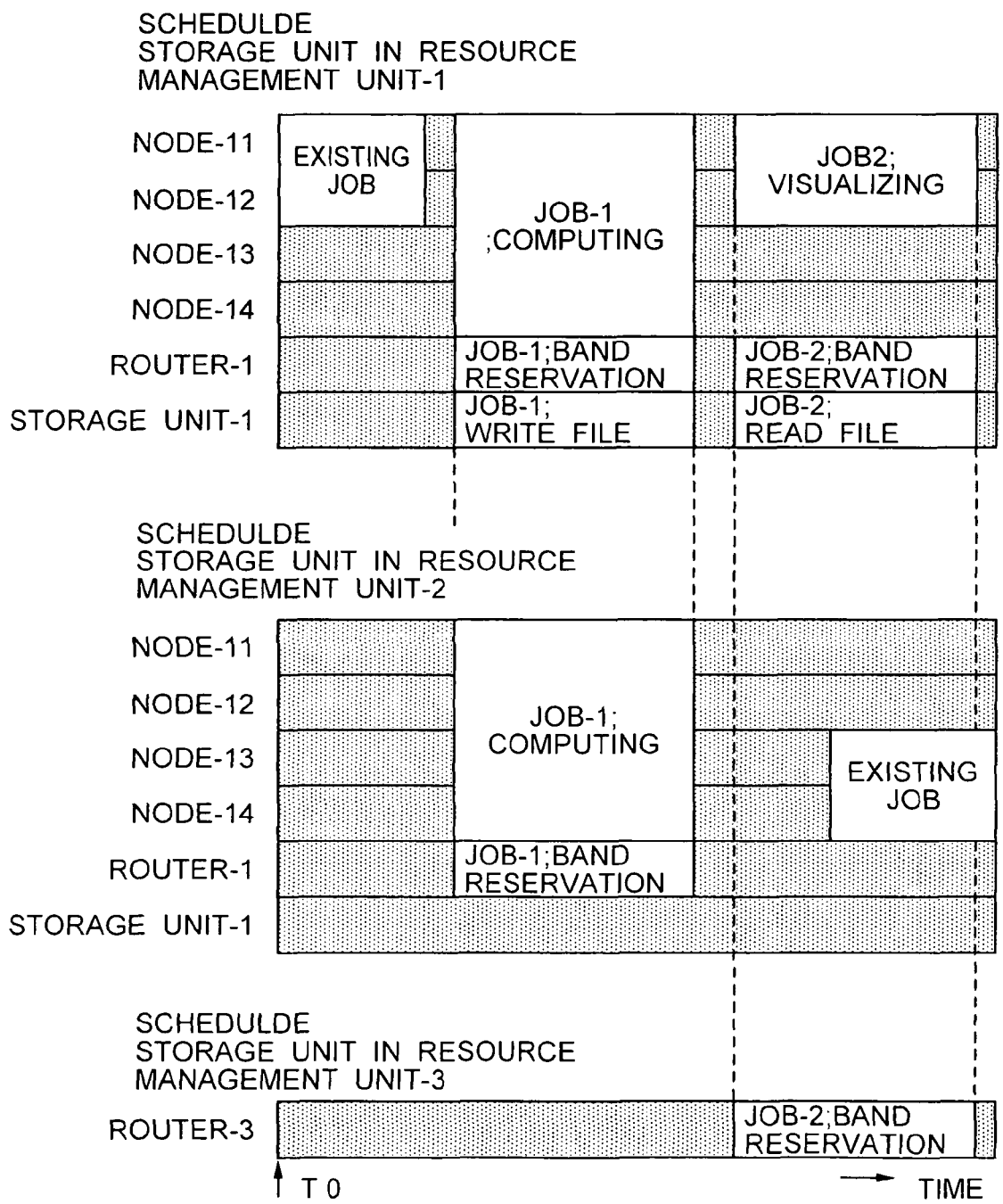
FIG. 23 is a schematic diagram showing the results of job scheduling in the resource management units in the second embodiment of the present invention.

FIG. 23 shows the final contents stored in the schedule storage unit 160 in the resource management unit of each domain. More specifically, a computing process for job-1 on node-11 to node-14, band reservation for job-1 on router-1, and writing the file in the storage unit-1 for job-1 are registered in the schedule storage unit 160 of the resource management unit-1 100 of domain-1; for the same time period, a computing process for job-1 on node-21 to node-24 and band reservation for job-1 on router-2 are registered in the schedule storage unit 160 of the resource management unit-2 100 of domain-2; subsequently, a computing process for job-2 on node-11 to node-14, band reservation for job-2 on router-1, and reading the file in the storage unit-1 for job-2 are registered in domain-1; and for the same time period, band reservation for job-2 is registered in the schedule storage unit 160 of the resource management unit-3 100 of domain 3. It is to be noted that the above execution schedule is an example and the final contents are not necessarily limited to the above example.

Since the above embodiments are described only for examples, the present invention is not limited to the above embodiments and various modifications or alterations can be easily made therefrom by those skilled in the art without departing from the scope of the present invention.

What is claimed is:

1. A resource management unit for managing one or a plurality of resources, comprising:
   a first section that, upon accepting a tentative reservation request designating at least one resource, changes a state of a free time period of said designated resource to a tentatively reserved time period based on said tentative reservation request, if the designated resource has no previous tentative reservation request and has the free time period, stores an expiration time of said tentatively reserved time period indicating a valid time, and information of an issuer of said tentative reservation request, wherein the valid time indicates a time period during which said tentative reservation request is valid, and the tentative reservation is added to a schedule storage unit;
   a storage unit for storing said tentative reservation request in a wait queue corresponding to said designated resource, if the previous tentative reservation request designating the same resource and having previously tentatively reserved the free time period exists and the expiration time of the previously tentatively reserved time period is not expired; and
   a second section that generates information of said tentatively reserved time period and a corresponding tentative reservation ID corresponding to said tentative reservation request in the wait queue;
   a unit that discards the tentative reservation request if a job reservation request has not been received before the valid time of the tentative reservation expires or a tentative reservation cancel request has been received for cancelling the tentative reservation;
   wherein a resource designated by the tentative reservation request may only be used by an issuer of the tentative reservation request if the job reservation request is issued after the tentative reservation within the valid time of the tentative reservation,
   the cancel request is processed if the ID in the cancel request matches the tentative reservation ID,
   the cancel request removes the tentative reservation in the wait queue or the schedule storage unit depending on where the tentative reservation is stored,
   the unit further validates and takes out from the wait queue a next tentative reservation request that is made for the same resource as the removed tentative reservation and places it in the schedule storage unit, and
   the job reservation request reserves a resource in advance for the execution of a specific job when the issuer of the job reservation request matches the issuer of the tentative reservation,
   a job scheduler which creates an execution schedule that ignores the tentative reservation request remaining in the wait queue.

2. The resource management unit according to claim 1, wherein the tentative reservation request is accepted by the first section, the resource management unit further comprising:
   a fourth section that, upon receiving the job reservation request designating said tentative reservation ID and requesting a reservation time period, changes said tentatively reserved time period to the reservation time period designated by said job reservation request to be actually reserved for an execution of the job, if said reservation time period designated by said job reservation request is included in said tentatively reserved time period corresponding to said designated tentative reservation ID and an issuer of said job reservation request matches with said issuer of said tentative reservation request.

3. The resource management unit according to claim 1, wherein the tentative reservation request is stored in the wait queue, the resource management unit further comprising:

a sixth section that reads out said next tentative reservation request stored in said wait queue, reserves said free time period to a newly tentatively reserved time period based on said next tentative reservation request, and stores information of an issuer of said next tentative reservation request; and a seventh section that provides information of said newly tentatively reserved time period and a corresponding tentative reservation ID to the issuer of said next tentative reservation request.

4. A job scheduler communicating with at least one resource management unit for scheduling a job, said job scheduler comprising:

a computer which controls operation of:

a first member that issues a tentative reservation request designating resources of a plurality of resources to be used in a job, to the resource management unit managing said resources;

a second member that receives a notification in response to said tentative reservation request, the notification identifying a tentatively reserved state of said resources, wherein free time periods of the designated resources are tentatively reserved for the tentative reservation request and an expiration time of the tentatively reserved time periods is generated, which expiration time indicates a valid time wherein the valid time indicates a time period during which said tentative reservation request is valid;

wherein said tentative reservation request is stored in a schedule storage unit if the resources designated by the tentative reservation request has no previous tentative reservation request; or else said tentative reservation request is stored in a wait queue, wherein the free time periods of the designated resources are not tentatively reserved;

a third member that assigns the job to at least one first resource among the resources, for which said tentatively reserved state is received, while excluding at least one second resource among said resources, for which the tentatively reserved state is received, to create a job schedule including an execution time period of said job for said at least one first resource, and stores the job schedule in a storage unit;

a fourth member that issues a job reservation request for said first resource, to said resource management unit; and a fifth member that issues a tentative reservation cancel request for said at least one second resource, to said resource management unit, wherein the tentative reservation request is discarded if a job reservation request has not been received before the valid time of the tentative reservation expires or the tentative reservation cancel request has been received for cancelling the tentative reservation, a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue, and placed it in the schedule storage unit, the job reservation request reserves a resource in advance for the execution of a specific job when the issuer of the job reservation request matches the issuer of the tentative reservation, and the job scheduler creates an execution schedule that ignores the tentative reservation request remaining in the wait queue.

5. The job scheduler according to claim 4, further comprising:

a sixth member that, after receiving the notification of storage of said tentative reservation request in said wait queue from said resource management unit, controls said third member to create said job schedule either after a designated time interval elapsed since receiving said notification of the storage without a further notification, or after receiving another notification indicating that said tentative reservation request is obtained from said wait queue and a state of the designated resource is changed to said tentatively reserved state for the obtained tentative reservation request.

6. A distributed resource management system comprising:

a computer which controls operation of:

at least one resource management unit, which manages a plurality of resources, comprising:

a first section that, upon accepting a tentative reservation request designating at least one resource, changes a state of a free time period of said designated resource to a tentatively reserved time period based on said tentative reservation request, if the designated resource has no previous tentative reservation request and has the free time period, stores an expiration time of said tentatively reserved time period indicating a valid time, and information of an issuer of said tentative reservation request, wherein the valid time indicates a time period during which said tentative reservation request is valid, and the tentative reservation is added to a schedule storage unit;

a storage unit for storing said tentative reservation request in a wait queue corresponding to said designated resource, if the previous tentative reservation request designating the same resource and having previously tentatively reserved free time period exists and the expiration time of the previously tentatively reserved time period is not expired;

a second section that generates information of said tentatively reserved time period and a corresponding tentative reservation ID in response to said tentative reservation request in the wait queue;

a unit that discards the tentative reservation request if a job reservation request has not been received before the valid time of the tentative reservation expires or a tentative reservation cancel request has been received for cancelling the tentative reservation; and a job scheduler communicating with said resource management unit, said job scheduler comprising:

a first member that issues the tentative reservation request designating resources of the plurality of resources to be used in a job, to said resource management unit;

a second member that receives information of a tentatively reserved state of said resources from said resource management unit, if the resources are tentatively reserved;

a third member that assigns the job to at least one first resource, for which said tentatively reserved state is received, and which is selected from said plurality of resources, while excluding at least one second resource, for which said tentatively reserved state is received, among said plurality of resources, to create a job schedule including an execution time period of said first resource, and stores the job schedule in a storage unit;

a fourth member that issues a job reservation request for said first resource, to said resource management unit; and a fifth member that issues a tentative reservation cancel request for said second resource, to said resource management unit;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, the unit further validates and takes out from the wait queue a next tentative reservation request that is made for the same resource as the removed tentative reservation and places it in the schedule storage unit, the job reservation request reserves a resource in advance for the execution of a specific job when the issuer of the job reservation request matches the issuer of the tentative reservation, and the job scheduler creates an execution schedule that ignores the tentative reservation request remaining in the wait queue.

7. A distributed resource management system comprising:
a computer which controls operation of:
at least one resource management unit that manages one or a plurality of resources; and
at least one job scheduler communicating with said at least one resource management unit, said job scheduler having a job reservation function for issuing a tentative reservation request and a job reservation request for the plurality of resources to be used in a job,
said resource management unit comprising:
a first section that receives said tentative reservation request and the job reservation request, issued by said job scheduler, wherein:
   tentative reservation is a combinational operation of acquiring a reservation state of resources and tentatively reserving the resources and is performed by designating at least one resource and reserving a tentatively reserved time period within a free time period of the designated resource, and
   job reservation includes an operation of reserving the resources in advance for an execution of the job and is performed via the job reservation request designating the at least one resource and reserving an execution time period in the resource;
a second section that, if the resource, for which said tentative reservation request is received, does not have another tentative reservation request and has the free time period, sets a tentatively reserved state for said resource and generates information of said tentatively reserved state including the tentatively reserved time period set within the free time period, in response to said tentative reservation request; and the tentative reservation is added to a schedule storage unit;

a wait queue that stores said tentative reservation request if the resources designated by the tentative reservation request does have another tentative reservation request;

a third section that stores, in a storage unit, an expiration time of the tentatively reserved time period indicating a valid time, and information of said job scheduler having issued said tentative reservation request, wherein the valid time indicates a time period during which said tentative reservation request is valid;

a fourth section that accepts said job reservation request and changes the tentatively reserved time period to the execution time period specified by said job reservation request to be reserved for the execution of the job, if the specified execution time period is included in the tentatively reserved time period and the issuer of said job reservation request matches with the issuer of the tentative reservation request;

a fifth section that, when a start time specified by the job reservation request is reached, controls to allocate the resource for the execution of the job and, when an end time specified by said job reservation request is reached, controls to release allocation of the resource from the job; and a unit that discards the tentative reservation request if the job reservation request has not been received before the valid time of the tentative reservation expires or a tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, the unit further validates and takes out from the wait queue a next tentative reservation request that is made for the same resource as the removed tentative reservation and places it in the schedule storage unit, the job reservation request reserves a resource in advance for the execution of a specific job when the issuer of the job reservation request matches the issuer of the tentative reservation, and the job scheduler creates an execution schedule that ignores the tentative reservation request remaining in the wait queue.

8. The distributed resource management system according to claim 7, wherein said resource management unit accepts cancel requests including the tentative reservation cancel request and a job cancel request issued corresponding to said tentative reservation request and the job reservation request issued by said job scheduler.

9. The distributed resource management system according to claim 7, further comprising at least one user terminal communicating with said job scheduler for inputting through said user terminal the job to said job scheduler, wherein said job scheduler comprises a first member that assigns said job input through said user terminal to the resources including at least one of:

a process of issuing the tentative reservation request to said resource management unit;

a process of creating an execution schedule of the job for the resources for which said tentative reservation was successful; and a process of issuing the job reservation request according to said execution schedule to said resource management unit.

10. The distributed resource management system according to claim 7, wherein said resource management unit comprises:
    the schedule storage unit that stores, for each resource managed by said resource management unit, information of said job designating said resources and the execution time period for which each resource is reserved;
    a tentative-reservation-request storage unit that has a wait queue for each resource managed by said resource management unit, wherein a waiting tentative reservation request for said resource is stored in said wait queue;
    a tentative-reservation-request receiving section that receives the tentative reservation request from said job scheduler and stores information of the tentative reservation request in said schedule storage unit or said tentative-reservation-request storage unit;
    a job-reservation-request receiving section that receives the job reservation request from said job scheduler and stores information of the job reservation request in said schedule storage unit; and
    a schedule management section that monitors the information of the job reservation request and the tentative reservation request stored in said schedule storage unit and performs at least one of allocating and releasing the resources and discarding of said tentative reservation request according to the information of said job reservation request and said tentative reservation request.

11. The distributed resource management system according to claim 10, wherein said resource management unit comprises:
    a tentative-reservation-cancel-request receiving section that receives the tentative reservation cancel request from said job scheduler and discards information of a corresponding tentative reservation request from said schedule storage unit or said tentative-reservation-request storage unit; and
    a job-cancel-request receiving section that receives a job reservation cancel request from said job scheduler and discards information of a corresponding job reservation request from said schedule storage unit and releases the resources allocated to the job.

12. The distributed resource management system according to claim 9, wherein said job scheduler comprises:
    a waiting-job storage unit that temporarily stores information of the job input through said user terminal;
    a schedule storage unit that stores information of the job for which the job reservation request is confirmed for each resource;
    a job-execution-request receiving member that receives a job execution request from said user terminal and stores contents of said job execution request in said waiting-job storage unit; and
    a job scheduling member that obtains the job stored in said waiting-job storage unit and assigns the job to the resources including issuing the tentative reservation request to said resource management unit, creating the job execution schedule, and issuing the job reservation request to said resource management unit.

13. The distributed resource management system according to claim 12, wherein said job scheduler comprises:
    a job-cancel-request receiving member that, upon receiving a job cancel request from said user terminal, discards the job stored in said waiting-job storage unit or a corresponding job registered in said schedule storage unit, and issues a job reservation cancel request to said resource management unit.

14. The distributed resource management system according to claim 7, wherein said resource management unit further comprises:
    a sixth section that assigns the resources for the execution of said job according to the job reservation request received from said job scheduler; and
    a seventh section that, upon receiving a new tentative reservation request for previously tentatively reserved resources, stores said new tentative reservation request in a wait queue provided for each of the resources, wherein when a previous tentative reservation request is discarded due to a tentative reservation cancel request or a lapse of the expiration time indicating the validity of the time period tentatively reserved for the previous tentative reservation request, the new tentative reservation request directed to the same resource as the discarded tentative reservation request is obtained from the wait queue, and becomes a valid tentative reservation request,
    an eighth section that, when the new tentative reservation request is obtained from said wait queue, issues a notification of said valid tentative reservation request to said job scheduler having issued said new tentative reservation request,
    said job scheduler further comprising:
    a first member that controls such that, when the new tentative reservation request issued by said job scheduler has entered said wait queue, creation of the job execution schedule waits until said new tentative reservation request becomes valid and then starts the creation of the job execution schedule.

15. The distributed resource management system according to claim 13, wherein said first member of said job scheduler further controls such that, if the new tentative reservation request does not become valid in a predetermined time interval, said job execution schedule is created while excepting the resource corresponding to the new tentative reservation request stored in said wait queue.

16. A method for use in a resource management unit that manages one or a plurality of resources, the method comprising:
    accepting a tentative reservation request designating at least one resource if the designated resource has no previous tentative reservation request and has a free time period; and adding the tentative reservation to a schedule storage unit;
    changing a state of the free time period of said designated resource to a tentatively reserved time period based on said tentative reservation request;
    storing an expiration time of said tentatively reserved time period indicating a valid time, and information of an issuer of said tentative reservation request, wherein the valid time indicates a time period during which said tentative reservation request is valid;
    storing said tentative reservation request in a wait queue corresponding to said designated resource, if the tentative reservation request designating the same resource and having previously tentatively reserved the free time period exists and the expiration time of the previously tentatively reserved time period is not expired;
    generating information of said tentatively reserved time period and a corresponding tentative reservation ID corresponding to said tentative reservation request; and discarding the tentative reservation request if a job reservation request has not been received before the valid time of the tentative reservation expires or a tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue and placed in the schedule storage unit, the job reservation request reserves a resource in advance for the execution of a specific job when the issuer of the job reservation request matches the issuer of the tentative reservation, and an execution schedule that ignores the tentative reservation request remaining in the wait queue is created.

17. The method according to claim 16, wherein the tentative reservation request is accepted, the method further comprising:

receiving the job reservation request designating said tentative reservation ID and a reservation time period;

changing the tentatively reserved time period to said reservation time period designated by said job reservation request to be actually reserved for an execution of the job, if said reservation time period designated by said job reservation request is included in said tentatively reserved time period corresponding to said designated tentative reservation ID and an issuer of said job reservation request matches with said issuer of said tentative reservation request.

18. The method according to claim 16, further comprising:

canceling said previously tentatively reserved time period for which said expiration time has expired to revive said free time period;

reading out said next tentative reservation request stored in said wait queue, changing the state of said revived free time period to a newly tentatively reserved time period based on said next tentative reservation request, storing information of an issuer of said next tentative reservation request; and providing information about said newly tentatively reserved time period and a corresponding tentative reservation ID to the issuer of said next tentative reservation request.

19. A method for use in a job scheduler, communicating with one or a plurality of resource management units, for scheduling a job, said method comprising:

issuing at least one tentative reservation request designating resources from a plurality of resources to be used in the job to at least one resource management unit managing said plurality of said resources;

receiving a notification in response to said tentative reservation request, the notification identifying a tentatively reserved state of said resources, wherein free time periods of the designated resources are tentatively reserved for the tentative reservation request and an expiration time of the tentatively reserved time periods is generated, which expiration time indicates a valid time, wherein the valid time indicates a time period during which said tentative reservation request is valid;

storing said tentative reservation request in a schedule storage unit if the resources designated by the tentative reservation request has no previous tentative reservation request; or else storing said tentative reservation request in a wait queue, wherein the free time periods of the designated resources are not tentatively reserved;

assigning the job to at least one first resource among the plurality of resources, for which said tentatively reserved state is received, while excluding at least one second resource among said plurality of resources, for which said tentatively reserved state is received, to create a job schedule including an execution time period of said job for said at least one first resource;

issuing a job reservation request for said first resource, to said resource management unit;

issuing a tentative reservation cancel request for said at least one second resource, to said resource management unit; and discarding the tentative reservation request if the job reservation request has not been received before the valid time of the tentative reservation expires or a tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue and placed in the schedule storage unit, the job reservation request reserves a resource in advance for the execution of a specific job when the issuer of the job reservation request matches the issuer of the tentative reservation, and an execution schedule that ignores the tentative reservation request remaining in the wait queue is created.

20. The method according to claim 19, further comprising:

creating, after receiving the notification of storage of said tentative reservation request in said wait queue from said resource management unit, said job schedule either after a designated time interval elapsed since receiving said notification without a further notification, or after receiving another notification indicating that said tentative reservation request is obtained from said wait queue and said tentatively reserved state is generated for the obtained tentative reservation request.

21. A method for use in a distributed resource management system including at least one resource management unit for managing at least one resource and at least one job scheduler communicating with said resource management unit having a job reservation function for reserving resources to be used in a job, said method comprising:

receiving a tentative reservation request and a job reservation request, issued by said job scheduler, wherein:

tentative reservation is a combinational operation of acquiring a reservation state of the resources and tentatively reserving the resources and is performed by designating at least one resource and reserving a tentatively reserved time period within a free time period of the designated resource, and job reservation includes reserving the resources in advance for an execution of the job and is performed via the job reservation request designating the at least one resource and reserving an execution time period in the resource;

setting in said resource management unit a tentatively reserved state for said resource and reserving the tentatively reserved time period in response to said tentative reservation request, if the resource, for which said tentative reservation request is received, does not have another tentative reservation request and has the free time period; adding the tentative reservation to a schedule storage unit;

storing the tentative reservation in a wait queue if the resource requested by the reservation does have another tentative reservation request;

storing in said resource management unit an expiration time of the tentatively reserved time period indicating a valid time, and information of said job scheduler having issued said tentative reservation request, wherein the valid time indicates a time period during which said tentative reservation request is valid;

accepting, by said resource management unit, said job reservation request and changing the tentatively reserved time period to the execution time period designated by said job reservation request to be reserved for an execution of the job, if the designated execution time period is included in the tentatively reserved time period and an issuer of said job reservation request matches with the issuer of the tentative reservation request; and controlling to allocate the resource for the execution of the job when a start time designated by the job reservation request is reached, and to release allocation of the resource from the job when an end time designated by said job reservation request is reached; and discarding the tentative reservation request if the job reservation request has not been received before the valid time of the tentative reservation expires or a tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue and placed in the schedule storage unit, the job reservation request reserves a resource in advance for the execution of a specific job when the issuer of the job reservation request matches the issuer of the tentative reservation, and an execution schedule that ignores the tentative reservation request remaining in the wait queue is created.

22. The method according to claim 21, wherein said resource management unit accepts cancel requests including the tentative reservation cancel request and a job cancel request issued corresponding to said tentative reservation request and the job reservation request issued by said job scheduler.

23. The method according to claim 21, further comprising assigning the job to the resources by said job scheduler, said job being input from a user terminal to said job scheduler, said assigning comprising:
issuing the tentative reservation request to said resource management unit;
creating an execution schedule of the job for the resources for which said tentative reservation was successful; and
issuing the job reservation request according to said execution schedule to said resource management unit.

24. The method according to claim 21, further comprising:
upon receiving the tentative reservation request in the resource management unit, storing information of a corresponding tentative reservation request in a schedule storage unit or in a wait queue provided in said resource management unit for each of said resources;
upon receiving said job reservation request in said resource management unit, storing information of a corresponding job reservation request in said schedule storage unit; and
monitoring the information of said job reservation request and said tentative reservation request, to perform one of allocating and releasing the resources, and discarding said tentative reservation request based on the information of said job reservation request and said tentative reservation request.

25. The method according to claim 21, further comprising at least one of:
receiving the tentative reservation cancel request in said resource management unit from said job scheduler to discard information of a corresponding tentative reservation request from said schedule storage unit or said wait queue; and
receiving a job reservation cancel request from said job scheduler to discard information of a corresponding job reservation request from said schedule storage unit and release resources allocated to the job.

26. The method according to claim 21, further comprising:
receiving a job execution request from said user terminal to store contents of a corresponding job in said job scheduler;
creating a job schedule corresponding to said job execution request in said job scheduler; and
assigning the job to the resources including issuing of the tentative reservation request to said resource management unit, creating a job execution schedule, and issuing the job reservation request to said resource management unit.

27. The method according to claim 26, further comprising:
upon receiving a job cancel request from said user terminal in the job scheduler, discarding in said job scheduler the job stored in a waiting job storage unit or a corresponding job registered in said schedule storage unit; and
issuing a job reservation cancel request from said job scheduler to said resource management unit.

28. The method according to claim 21, further comprising:
allocating the resources to an execution of said job according to the job reservation request received from said job scheduler;
upon receiving a new tentative reservation request for previously tentatively reserved resources by a previous tentative reservation request, storing said new tentative reservation request in a wait queue provided for each of the resources, wherein when the previous tentative reservation request is discarded due to a tentative reservation cancel request or a lapse of the expiration time of a tentatively reserved time period for the previous tentative reservation request, the new tentative reservation request directed to the same resource as the discarded tentative reservation request is obtained from the wait queue, and becomes a valid tentative reservation request, upon the new tentative reservation request being obtained from said wait queue, issuing a notification of said valid tentative reservation request from said resource management unit to said job scheduler having issued said new tentative reservation request;

controlling said job scheduler such that, when the new tentative reservation request enters said wait queue, creation of a job execution schedule waits until said new tentative reservation request becomes the valid tentative reservation request and then starts the creation of the job execution schedule.

29. The method according to claim 28, further comprising: ignoring the new tentative reservation request stored in said wait queue and proceeding to the creation of the job execution schedule, if the new tentative reservation request does not become valid in a predetermined time period.

30. A distributed resource management system comprising:
a resource management unit for managing resources;
a job scheduler communicating with said resource management unit to schedule a job to use said resources; and
a user terminal communicating with said job scheduler for issuing a first tentative reservation request prior to issuing a job reservation request for said resources, to said resource management unit;
said resource management unit comprising:
a first section that receives said first tentative reservation request from said job scheduler to set a state of the resource designated by said first tentative reservation request to a tentatively reserved state and tentatively reserve a free time period of the designated resource for the first tentative reservation, including setting an expiration time indicating a valid time of the tentatively reserved time for the first tentative reservation request, wherein the valid time indicates a time period during which said tentative reservation request is valid, and the first tentative reservation is added to a schedule storage unit; and
a second section that, when a second tentative reservation request is issued for the resource previously tentatively reserved for the first tentative reservation, stores the second tentative reservation request in a wait queue of a storage unit,
wherein said user terminal requests said job scheduler to execute the job, and
said job scheduler comprises a first member that, after issuing the first tentative reservation request to said resource management unit, determines the resources to which the job is assigned and issues the job reservation request to said resource management unit to reserve the resources for an execution of the job,
wherein said resource management unit further comprises:
a unit that discards the first tentative reservation request if a job reservation request has not been received before the valid time of the first tentative reservation expires or a tentative reservation cancel request has been received for cancelling the first tentative reservation, wherein a resource designated by the first tentative reservation request may only be used by an issuer of the first tentative reservation request if the job reservation request is issued after the first tentative reservation within the valid time of the first tentative reservation,
the cancel request is processed if the ID in the cancel request matches the first tentative reservation ID,
the cancel request removes the first tentative reservation in the wait queue or the schedule storage unit depending on where the first tentative reservation is stored,
the unit further validates and takes out from the wait queue the second tentative reservation request that is made for the same resource as the removed first tentative reservation and places the second tentative reservation in the schedule storage unit,
the job reservation request reserves a resource in advance for the execution of a specific job when the issuer of the job reservation request matches the issuer of the tentative reservation, and
the job scheduler creates an execution schedule that ignores the second tentative reservation request remaining in the wait queue.

31. A distributed resource management method for a distributed resource system including at least one resource management unit that manages one or a plurality of resources, at least one job scheduler communicating with said at least one resource management unit and scheduling a job to use said resources, and at least one user terminal communicating with said job scheduler, said method comprising:
issuing a first tentative reservation request prior to issuing a job reservation request from said job scheduler for said resources to said resource management unit;
tentatively reserving free time periods of the resources for the first tentative reservation and storing an expiration time of the tentatively reserved time periods, which expiration time indicates a valid time indicating a time period during which the first tentative reservation request is valid;
adding the first tentative reservation to a schedule storage unit;
issuing a second tentative reservation request for previously tentatively reserved resource for the first tentative reservation, by said job scheduler;
storing said second tentative reservation request in a wait queue of said resource management unit; and
after issuing the first tentative reservation request to said resource management unit for said resources, determining the resources to which the job is assigned and issuing the job reservation request to said resource management unit to reserve the resources for an execution of the job,
wherein the first tentative reservation request is discarded if a job reservation request has not been received before the valid time of the first tentative reservation expires or a tentative reservation cancel request has been received for cancelling the first tentative reservation,
a resource designated by the first tentative reservation request may only be used by an issuer of the first tentative reservation request if the job reservation request is issued after the first tentative reservation within the valid time of the first tentative reservation,
the cancel request is processed if the ID in the cancel request matches the first tentative reservation ID,
the cancel request removes the first tentative reservation in the wait queue or the schedule storage unit depending on where the first tentative reservation is stored, the second tentative reservation request that is made for the same resource as the removed first tentative reservation is validated, taken out from the wait queue, and placed in the schedule storage unit, the job reservation request reserves a resource in advance for the execution of a specific job when the issuer of the job reservation request matches the issuer of the tentative reservation, and the job scheduler creates an execution schedule that ignores the second tentative reservation request remaining in the wait queue.

32. A non-transitory computer readable medium storing a program, which when, executed by a computer constituting a resource management unit, which manages one or a plurality of resources, causes the computer to execute a method comprising:

accepting a tentative reservation request designating at least one resource, if the designated resource has no previous tentative reservation request and has at least one free time period to be tentatively reserved for the tentative reservation request;

changing a state of the at least one free time period of said designated resource to a tentatively reserved time period;

storing information of an expiration time of said tentatively reserved time period indicating a valid time, and information about an issuer of said tentative reservation request, wherein the valid time indicates a time period during which said tentative reservation request is valid;

adding the tentative reservation to a schedule storage unit;

storing said tentative reservation request in a wait queue for said designated resource, if the previous tentative reservation request designating the same resource and having the free time period tentatively reserved exists and the expiration time of said previously tentatively reserved time period is not expired;

providing information of said tentatively reserved time period and a corresponding tentative reservation ID corresponding to said tentative reservation request; and discarding the tentative reservation request if the job reservation request has not been received before the valid time of the tentative reservation expires or a tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue, and placed in the schedule storage unit, the job reservation request reserves a resource in advance for the execution of a specific job when the issuer of the job reservation request matches the issuer of the tentative reservation, and an execution schedule that ignores the tentative reservation request remaining in the wait queue is created.

33. The medium according to claim 32, wherein the tentative reservation request is accepted and the method further comprises:

receiving the job reservation request designating said tentative reservation ID and a request time period, changing said tentatively reserved time period to the request time period designated by said job reservation request to be reserved for an execution of the job, if said request time period is included in said tentatively reserved time period corresponding to said tentative reservation ID and an issuer of said job reservation request matches with the issuer of said tentative reservation request.

34. The medium according to claim 32, wherein the tentative reservation request is stored in the wait queue and the method further comprises:

canceling said previously tentatively reserved time period for which said expiration time has expired to revive said free time period;

obtaining the next tentative reservation request from said wait queue;

changing a state of said revived free time period to a newly tentatively reserved time period based on said next tentative reservation request;

storing information identifying the issuer of said next tentative reservation request; and providing a notification of said newly tentatively reserved time period and a tentative reservation ID corresponding to said next tentative reservation request to the issuer thereof.

35. A non-transitory computer readable medium storing a program, which, when executed by a computer constituting a job scheduler, that is communicating with a resource management unit, which manages one or a plurality of resources, causes the computer to execute a method comprising:

issuing a tentative reservation request for the resources to be used by a job, to said resource management unit;

tentatively reserving the resources including tentatively reserving free time periods of the resources, based on the tentative reservation request;

setting an expiration time indicating a valid time of the tentatively reserved time periods, wherein the valid time indicates a time period during which said tentative reservation request is valid;

storing said tentative reservation request in a wait queue of said resource management unit if the resource requested by the tentative reservation request have another tentative request;

adding the tentative reservation to a schedule storage unit if the resource requested by the tentative reservation request does not have another tentative resource request;

selecting the resources to which said job is assigned from the resources that are tentatively reserved by said resource management unit and reserving an execution time period, for an execution of the job, within the tentatively reserved time periods for which the expiration time is not expired;

issuing a job reservation request for the resources selected by said selecting to said resource management unit;

issuing a tentative reservation cancel request for at least one of the resources tentatively reserved by said tentative reservation request, to said resource management unit; and discarding the tentative reservation request if the job reservation request has not been received before the valid time of the tentative reservation expires or the tentative reservation cancel request has been received for cancelling the tentative reservation;

wherein a resource designated by the tentative reservation request may only be used by an issuer of the tentative reservation request if the job reservation request is issued after the tentative reservation within the valid time of the tentative reservation, the cancel request is processed if the ID in the cancel request matches the tentative reservation ID, the cancel request removes the tentative reservation in the wait queue or the schedule storage unit depending on where the tentative reservation is stored, a next tentative reservation request that is made for the same resource as the removed tentative reservation is validated, taken out from the wait queue, and placed in the schedule storage unit, the job reservation request reserves a resource in advance for the execution of a specific job when the issuer of the job reservation request matches the issuer of the tentative reservation, and an execution schedule that ignores the tentative reservation request remaining in the wait queue is created.

36. The medium according to claim 35, wherein the method further comprises:

controlling to proceed to said selecting after a predetermined time period has elapsed or a notification of said tentative reservation request having been obtained from said wait queue has arrived.

* * * * *